United States Patent [19]

Nakamura et al.

[11] Patent Number: 5,260,770
[45] Date of Patent: Nov. 9, 1993

[54] SYSTEM FOR DETECTING THE POSITION OF OBSERVATION SPOT

[75] Inventors: Toshikazu Nakamura; Sadachika Tsuzuki; Kazunori Noda; Kenji Kamimura, all of Saitama, Japan

[73] Assignee: Honda Giken Kogyo Kabushiki Kaisha, Tokyo, Japan

[21] Appl. No.: 875,693

[22] Filed: Apr. 29, 1992

[30] Foreign Application Priority Data

May 1, 1991 [JP] Japan .................. 3-126511
May 27, 1991 [JP] Japan .................. 3-149216

[51] Int. Cl.⁵ .................................... G01B 11/00
[52] U.S. Cl. ........................ 356/375; 180/169; 364/449
[58] Field of Search .............. 356/152, 373, 375; 180/169; 364/449

[56] References Cited

U.S. PATENT DOCUMENTS 5,011,288 4/1991 Noji et al. ................. 356/375
5,014,204 5/1991 Kamimura et al. ............ 356/375

*Primary Examiner*—F. L. Evans
*Attorney, Agent, or Firm*—Pollock, VandeSande and Priddy

[57] ABSTRACT

In a system for detecting a relative position of an observation spot and reference points fixed around the observation spot, a central axis of mirror rotation is precessed to draw a substantially conical locus so that a light beam is vertically vibrated, the azimuth of the rotative scanning direction and the precessional angle are stored when the light beam reflected by a light reflector at the reference point is detected, then the projection direction of the light beam is fixed at the detected rotative scanning and precession angles, the distance between the observation spot and the light reflector is measured on the basis of the detected signals, and the positions of the light reflectors with respect to the observation spot are calculated on the basis of the measured distances and azimuths.

15 Claims, 18 Drawing Sheets

| STORE NUMBER I | PRECESSION DIRECTION WHEN REFERENCE POINT (n) IS DETECTED As[n, I] | MIRROR ROTATION COUNTER VALUE WHEN REFERENCE POINT (n) IS DETECTED Cm[n, I] |
|---|---|---|
| 1 | 24.1 | 2 |
| 2 | 36.3 | 3 |
| 3 | 108.6 | 9 |
| 4 | 120.7 | 10 |
| 5 | 132.6 | 11 |
| 6 | 144.4 | 12 |

SYSTEM FOR DETECTING THE POSITION OF OBSERVATION SPOT

BACKGROUND OF THE INVENTION

1. Field of the Invention

The present invention is related to a system for detecting the position of a moving body, and particularly to a system for detecting the position of a moving body or moving vehicle such as a mobile machine used for agricultural or civil engineering works, or an automatic transporting apparatus used in a factory.

2. Description of the Prior Art

As such system for detecting the current position of a moving body as described above, a system has been proposed which comprises means for circularly scanning a light beam generated in a moving body around the moving body, retroreflector means fixed at at least three positions spaced apart from the moving body for reflecting light in the direction of incidence, and light beam receiver means for receiving the light reflected by the retroreflector means (Japanese Patent Application Laid-Open Publication No. 67476/1984).

In this system, the differential azimuths between two of the three retroreflector means as viewed from the moving body are detected on the basis of the outputs of the light beam receiver means. The position of the moving body is calculated based upon the detected azimuths and the information (positional information) representing the preset positions of the individual retroreflector means.

In the above system, a slight error in positional information of reference points or light reflector means affects the precision of the whole system control. For this, when the moving body is, for instance, a working machine in an agricultural region, the positional information of the light reflector means placed in each work area, that is, the distances and azimuthal angle differences between two individual light reflector means which are adjacent each other, had to be measured prior to the work by the working machine. It was very cumbersome to accurately measure the distances between and azimuthal angle differences between the two individual light reflector means placed in a wide work area like an agricultural region and input them for each work area as described above.

As an countermeasure, the present applicant proposed a system which can simplify the above-mentioned cumbersome tasks of measuring and inputting the positional information (Japanese Patent Application Laid-Open No. 287415/1989). In that system, the light beam projected from a moving vehicle or moving body is scanned and the light reflected by the light reflector means are detected. And that system provides for automation of the works of accurately measuring and inputting the distances between and relative azimuthal angles of the individual light reflector means according to the distances between the moving body and the light reflector means, and the azimuths of the light reflector means as seen from the moving body which are calculated on the basis of the reflected light detection signal.

However, the place where the distances between and relative angles of the light reflector means are measured, for instance, the traveling area of the moving body on which the position detecting system is mounted, is not always flat. Accordingly, the light beam may be scanned with the moving body being inclined depending on the lay of the land on which the moving body is placed for measuring the distances and azimuths, and it is possible that the light beam cannot irradiate the light reflector means by rotatively scanning the light beam only in a single plane or horizontal plane, and the light beam receiver means cannot detect the light reflected by the retroreflector means. Further, the light beam receiving means may receive the light from a reflecting object other than predetermined retroreflector means. If the light from the retroreflector means cannot be detected or the light from another object is accidentally detected as the reflected light of the predetermined retroreflector means, then it is possible that the position of the moving vehicle cannot correctly be calculated and the moving vehicle cannot be allowed to travel along a predetermined course.

As a countermeasure to the missing of retroreflector means, it has also been considered to vibrate the light beam in the vertical direction during the horizontal rotative scanning of the light beam. For instance, to allow a light beam to successfully be applied to retroreflector means, a light beam scanning apparatus was proposed in which the generated light beam is horizontally scanned while it is vertically vibrated at a high speed (frequency) by a galvano mirror or polygon mirror (Japanese Patent Application Laid-Open Publication No. 242313/1985).

FIGS. 22A and 22B show scan loci (tracks of light) of a light beam by such conventional apparatus. FIG. 22A shows a part of a light track when the light beam is subjected to a vertical vibration scan by a galvano mirror while it is rotatively scanned in the horizontal direction. FIG. 22B shows a part of the light track when the vertical vibration scan of the light beam is performed at a very high speed by a polygon mirror.

The above-mentioned light beam scanning apparatus has the following problems.

In the system wherein the light beam is also subjected to a vertical vibration scan with a predetermined amplitude using a galvano mirror, so that the light beam can be applied to the retroreflector means with a probability as high as possible even if the moving vehicle travels on an inclined road surface or it jolts, the amplitude of the light track at the retroreflector means becomes larger and the wavelength thereof or the gap between two adjacent light tracks becomes longer as the distance between the moving vehicle and the retroreflector means increases. For this, it may occur that the retroreflector means 6 cannot intersect the light beam track as shown in FIG. 22A, for example.

Also in the system utilizing a polygon mirror, the distance between any two adjacent light tracks at the retroreflector means 6 widens as the distance between the moving vehicle and the retroreflector means 6 increases. For this, it may occur that the retroreflector means 6 and the light beam cannot intersect as shown in FIG. 22B for example. It is required to increase the ratio of the vertical vibration speed to the horizontal scanning speed, or more particularly, to increase the vertical vibration speed and/or decrease the horizontal scanning speed for decreasing the wavelength of the light track or an interval between two adjacent light tracks, so that the light beam attacks more surely the light reflector means.

However, increasing the driving speed of the galvano mirror or polygon mirror is very difficult because of mechanical restrictions. If the scan speed in the horizontal direction is decreased, then the number of data received per minute decreases and the position detection precision degrades, and particularly reduction in detection precision is undesirably significant in the use for position detection of a moving body such as a moving vehicle.

SUMMARY OF THE INVENTION

It is an object of the present invention to provide a system for detecting the position wherein an azimuth and angle of the light beam projection is calculated, in which the light beam can be projected with high probability on a light reflective means the position of that is to be calculated, and the direction of the light beam projection is fixed at the calculated azimuth and angle, whereby a relative positional relation of the observation spot or the moving vehicle and the reference points is easily and accurately detected in a preparation of working.

It is a further object of the present invention to provide a system for detecting the position of an observation spot or a moving body wherein the light beam projected from the moving body can be applied to each retroreflector means with a high probability, whereby positional information of the light reflecting means, and the accuracy of the position detection based on the positional information can be enhanced.

The present invention is first characterized by a system comprising light beam generating means and light reception means to detect light signals both of which are disposed at the observation spot, light beam scanning means for rotatively scanning the light beam generated in said light beam generator means in a circular direction while vertically vibrating said light beam, means for detecting the azimuth of the incident light when a light signal is detected by said light receiver means, means for storing the substantially same azimuths of the detected ones as a single group of azimuthal data, reference point recognizing means for recognizing that the number of the detected azimuths has become equal to the number of previously placed light reflector means, means for stopping the rotative scanning of the light beam and fixing the projective direction of the light beam to the direction shown by each of said azimuths when the reflected light from said direction is detected after said reference point recognizing means has judged that the number of the detected azimuths has become equal to the number of the light reflector means, means for detecting the reflected light of said light beam with the projective direction of said light beam being fixed, and for measuring the distance between the observation spot and the light reflector means on the basis of the detection signal, means for releasing the fixing of the projective direction of the light beam after said distance measurement has finished, and means for repeating said distance measurements between all of said predetermined light reflector means and the observation spot, and for calculating the relative positional relations between said light reflector means and the observation spot on the basis of the measured distances and the azimuthal data therefor.

According to the invention first characterized above, the azimuthal data on the light reflector means displaced at the reference points are preliminarily detected and stored, then the light beam is certainly projected on the light reflector means in succession on the basis of the stored azimuthal data and the light reflected by the light reflector means is detected therefore, the distances between the light reflector means and the observation spot can be accurately measured and thus the position of the observation spot can be accurately calculated.

The present invention is secondly characterized in that the light beam generator and light receiver means are mounted on a common table, said table is precessed so that the central axis of rotation of said means for rotatively scanning a light beam draws a conical locus, and causing the rotative scanning of said light beam to be performed a plural number of times during one cycle of the precession, thereby to vertically vibrating said light beam.

According to the invention secondly characterized above, a mesh of light tracks is drawn on a side surface of a virtual cylinder centering around the observation spot by the precession of the table. More particularly, the light beam is rotatively scanned a plural of times in the vicinity of light reflecting means standing upright at various heights thereof. As a result, the light beam crosses the light reflecting means with fairly high probability so that the light receiver means can receive the light reflected by the reflector means.

Since the direction of the light beam projection is decided for distance measurement on the basis of detection of the light reflected by the reflector means, missing of the light reflecting means due to the inclination of the observation spot and/or lie of the land is decreased.

The present invention is thirdly characterized in further including means for detecting the precession angle of the table and the azimuth of light beam projection when a light signal is detected by the light receiver means, wherein the precession of the table is stopped at said detected precession angle, a second rotative scanning is performed in this stop condition of the table precession, and the second rotative scanning is stopped to fix the light beam projection direction on the condition that a light signal is again detected in the second rotative scanning condition, at the azimuth at which a light signal has been detected, for performing said distance measurement.

According to the invention thirdly characterized above, the rotative scan of light beam can be performed at rather low speed without vibration in the vertical direction, at a precession angle at which the light reflection means was detected at least once in a previous precession scan. In that condition, therefore, the light reflected by the light reflection means can be expected to be continuously received in a good and stable condition to measure the distance between the observation spot and reference point, because the light beam can be projected on the basis of stored data in the direction in which the light reflected by the light reflection means can be securely received.

DETAILED DESCRIPTION OF THE PREFERRED EMBODIMENT

Figure 2:
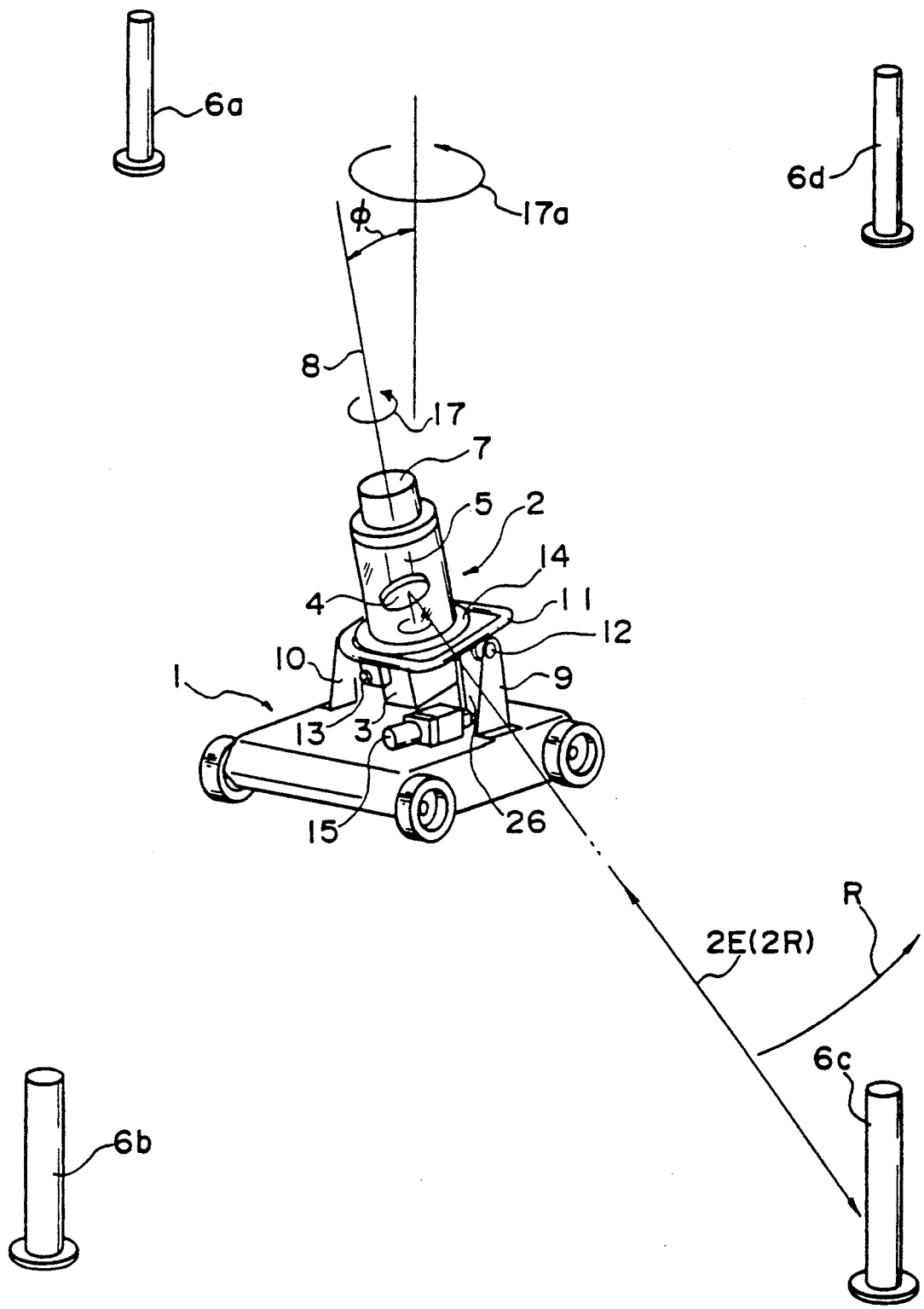
FIG. 2 is a perspective view showing the traveling state of a moving vehicle.

Now an embodiment of the present invention is described with reference to the drawings. FIG. 2 is a perspective view showing a moving vehicle which carries the position detecting system of the present invention and travels in a predetermined area.

In FIG. 2, around the area in which a moving body or a moving vehicle is to travel, optical retroreflectors (hereinafter simply referred to as reflectors) 6a-6d are disposed which have reflecting surfaces for reflecting an incoming light in the direction of its incidence. As the reflecting surface of reflectors 6a-6d, known light reflecting mean such as a corner cube prism is used. The moving vehicle 1 is, for instance, a lawn mower having a cutter blade for lawn mowing (not shown) on the underside of it. On the upper portion of the moving vehicle 1, a light beam scanner (hereinafter simply referred to as scanner) 2 is mounted. The scanner 2 has a light beam generator for generating a light beam 2E and a light beam receiver for detecting the light 2R reflected by the reflector 6a-6d. For instance, the light beam generator has a light emitting diode, and the light beam receiver has a photo diode for converting the incident light to an electric signal. The light beam generator and receiver are contained in a casing 3 which is attached to an inner ring member 14 on its under surface by a known connection means, for example, bolt clamping.

The light beam emanating from the light beam generator is reflected in a rectangular direction by a rotating mirror (hereinafter simply referred to as a mirror) 4, whereby it is projected to the outside of the scanner 2. Mirror 4 is rotated by a motor 5 around a central axis of rotation 8 in the direction of an arrow 17, and the light beam 2E is rotatively scanned by the rotation of the mirror 4 around the central axis of rotation 8 in the direction of an arrow R. The projective direction of the light beam 2E depending on the rotational position of the mirror 4, or the rotation angle of the motor 5 is detected by an encoder 7.

The scanner 2 has a gimbal precession mechanism for providing a scanning like a precession to continuously vary the angle of a rotative scanning plane drawn by the light tracks of the light beam 2E. The precession mechanism has an outer ring member 11 journaled for vibration with respect to a shaft 12 of a bracket 9 and a shaft (not shown) of a bracket 10, and the inner ring member 14 provided inside the outer ring 11. The inner ring member 14 is journaled for vibration by shaft 13 provided in the outer ring member 11 on a line perpendicular to a prolonged line of the supporting shaft of the outer ring member 11, and by the other shaft 20 (shown in FIG. 1) provided at the position opposite to the shaft 13.

The gimbal precession mechanism is driven by a motor 15 for vibratory drive. By the gimbal precession mechanism, the central axis of rotation 8 of the mirror 4 is mounted so that it inclines by an angle $\phi$ from a vertical line, and the inclinational direction thereof (hereinafter referred to as precession direction) continuously changes and rotates in the direction of an arrow 17a. The inclination angle of the scanning plane defined by rotative scanning of the light beam 2E continuously changes because of the precession movement or the conical rotation of the central axis of rotation 8. That is, the projective direction of the light beam 2E continuously changes in the upward and downward directions to vertically vibrate the light beam 2E.

Figure 1:
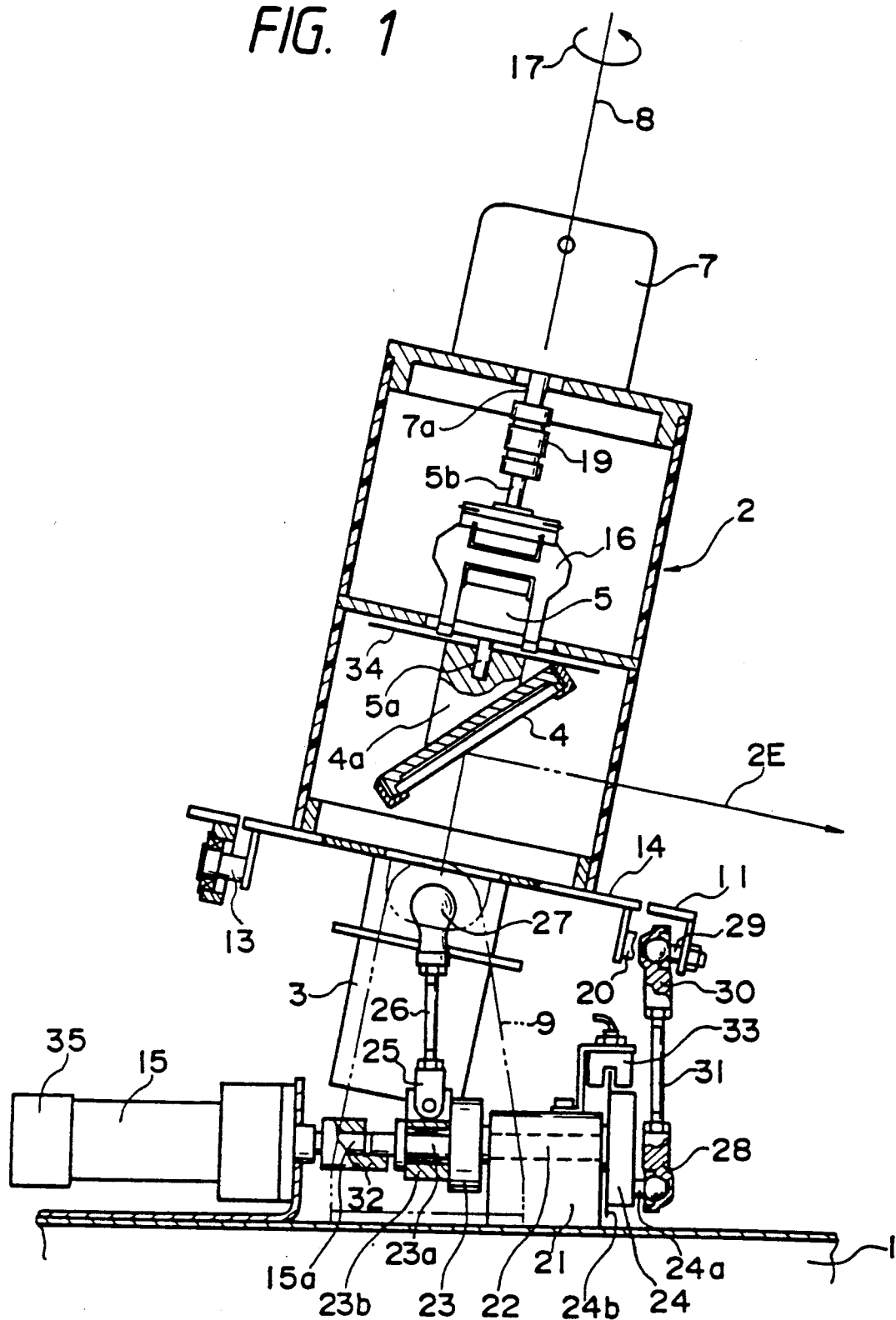
FIG. 1 is a cross-sectional view of the main portion of a light beam scanning apparatus.

The scanner and the drive means of the gimbal precession mechanism are detailed below. FIG. 1 is a cross-sectional view of the main portions of the scanner 2 mounted on the moving vehicle 1, and the same symbols as FIG. 2 represent the same or identical portions.

The scanner 2 is first described in detail. The mirror 4 is attached to one end 5a of the shaft of the motor 5 through a base 4a. The other end 5b of the shaft of the motor 5 is connected to a shaft 7a of encoder 7 by a connecting fitment 19. The output pulse of encoder 7 is transmitted to a controller, not shown, to be used for the calculation of the rotation angle and the number of revolutions of the mirror 4.

An attracting plate 34 is provided on the base 4a of the mirror 4. The attracting plate 34 is made of a magnetic substance, for instance, iron, and when an electromagnet 16 is energized, it is attracted by the magnet. That is, at any time when the electromagnet 16 is energized, the stop position of the mirror 4 is fixed.

Drive means of the gimbal precession mechanism is provided on the upper surface of the moving vehicle 1. A shaft 22 is substantially horizontally inserted through a bearing 21 mounted on the upper surface of the moving vehicle 1, a small disk 23 is substantially vertically connected with one end of the horizontal shaft 22, and a large disk 24 is substantially vertically connected with the other end thereof. The small disk 23 is provided with a projecting eccentric shaft 23a in an eccentric position with respect to the shaft 22, and the large disk 24 is similarly provided with a projecting eccentric shaft 24a. The eccentric shafts 23a and 24a are substantially parallel with each other, and their directions of eccentricity are shifted by 90 degrees from each other.

The shaft 15a of the motor 15 is aligned with the shaft 22, and a L-shaped block 32 is connected with the shaft 15a. That is, the eccentric shafts 23a and 24a are also eccentric to the shaft 15a by the same amount of eccentricity as that to the shaft 22, and the shaft 15a of the motor 15, eccentric shaft 23a, shaft 22 and eccentric shaft 24a form a crank mechanism. The rotation of shaft 15a by motor 15 is transmitted to the eccentric shaft 23a by block 32 and the shaft 22 rotates. As a result, eccentric shaft 24a also rotates around shaft 22.

An outer contact ring 23b is fitted over the eccentric shaft 23a for rotation, and a block 25 is journaled for vibration on outer contact ring 23b. The block 25 is connected by a connecting bolt 26 with a spherical bearing 27, which receives a projecting shaft (not shown) provided on the underside of the inner ring member 14.

Since the small disk 23 and inner ring member 14 are connected as described above, the rotational movement of eccentric shaft 23a around the shaft 15a due to the rotation of motor shaft 15a is converted to the reciprocating rotational motion of inner ring member 14 around the shafts 13 and 20.

A projecting eccentric shaft 24a provided in the large disk 24 is received in a spherical bearing 28. A projecting shaft 29 is provided in the outer ring member 11, and a spherical bearing 30 is supported by the shaft 29. The spherical bearing 28 and spherical bearing 30 are connected by a connecting bolt 31. With such construction, the outer ring member 11 is also rotationally reciprocated around the shaft 12 and the shaft opposed thereto (not shown) as the shafts 15a and 22 rotate, in a similar manner to the inner ring member 14.

When the reciprocating rotational motions of the outer ring member 11 and inner ring member 14 are combined together, the central axis of rotation 8 of the mirror 4 in the scanner 2 mounted on the inner ring member 14 turns around the intersection point of the respective central axis of the reciprocating rotational motions of both ring members 11 and 14, with a predetermined inclination angle being maintained with respect to the vertical line. In other words, the locus of the central axis of rotation 8 by this turning becomes the side face of a circular cone (hereinafter simply referred to as a cone) with the intersection point as the vertex. Since the casing 3 containing the light beam generator and receiver is also attached to the underside of the inner ring member 14, it turns integrally with the inner ring member 14.

Reverse screw threads are cut in both ends of the connecting bolt 26, and the connecting bolt 26 goes back or forth with respect to the block 25 and spherical bearing 27 when the connecting bolt is rotated, whereby the connecting length of the spherical bearing 27 and block 25 is adjusted. The connecting bolt 31 also adjusts the connecting length of the spherical bearings 28 and 30 into which the connecting bolt 31 is screwed, in a similar manner to the connecting bolt 26.

Thin disk 24b is provided on the large disk 24, and a sensor 33 for precession reference detection is provided to span over the thin disk 24b. For instance, the sensor 33 is a metal detection sensor or a light transmission/interruption type sensor, and by cutting a slit in a predetermined position of the circumference of the thin disk 24b, the reference position of precession can be detected on the basis of the detection signal of the slit which is output from the sensor 33.

Behind the motor 15, an encoder 35 for detecting the rotational position of the motor 15 is provided. By the output signal of encoder 35 and the output signal of sensor 33, the inclination direction or precession direction of the central axis of rotation 8 of the mirror 4 can be detected. Means for detecting the precession direction of the central axis of rotation 8 is not limited to the use of the encoder 35 and sensor 33. For instance, slits for detecting the rotation amount of the thin disk 24b may be cut in the thin disk 24b, separately from the slit for reference position detection, and these two kinds of slits may be detected by the two sensors. Also, it is possible to derive both signals indicating the rotation reference position and rotation amount of the motor 15 from encoder 35.

Although the precession locus of the central axis of rotation 8 is desirably a conical surface in order to evenly scan a light beam in the upward and downward directions and simplify the reception processing of the reflected light, it need not always be a circular cone, but it may be a cone the bottom of which is not a circle. For instance, by varying the eccentricity amount of the eccentric shaft 23a and/or 24a and making the respective maximum inclination angles of the outer and inner ring members 11 and 14 different, the locus to be drawn by the precession of the central axis of rotation 8 becomes an elliptic cone.

In the present embodiment, the amounts of eccentricity of the eccentric shafts 23a and 24a are set so that the precession locus becomes substantially a circular cone, or so that the respective maximum inclination angles of outer and inner ring members 11 and 14 are the same. Although the outer and inner ring members 11 and 14 are driven by one motor in the present embodiment, the respective ring members may be driven with separate motors. Of course, in such case, the individual motors should rotate at the same speed so that the central axis of rotation 8 draws a desired conical shape.

When the light beam is projected by the precession mechanism described above, the precession scan is performed in which the central axis of rotation 8 itself of the mirror 4 draws a cone, so that the plane (rotational scan plane) drawn by the light locus during the rotation of mirror 4 is not fixed at particular one and single plane, but it always varies during one precession cycle. By setting the rotation cycle of mirror 4 sufficiently shorter than the precession cycle of the central axis of rotation 8, a scanning locus can be a fine pitch as described later.

Figure 3:
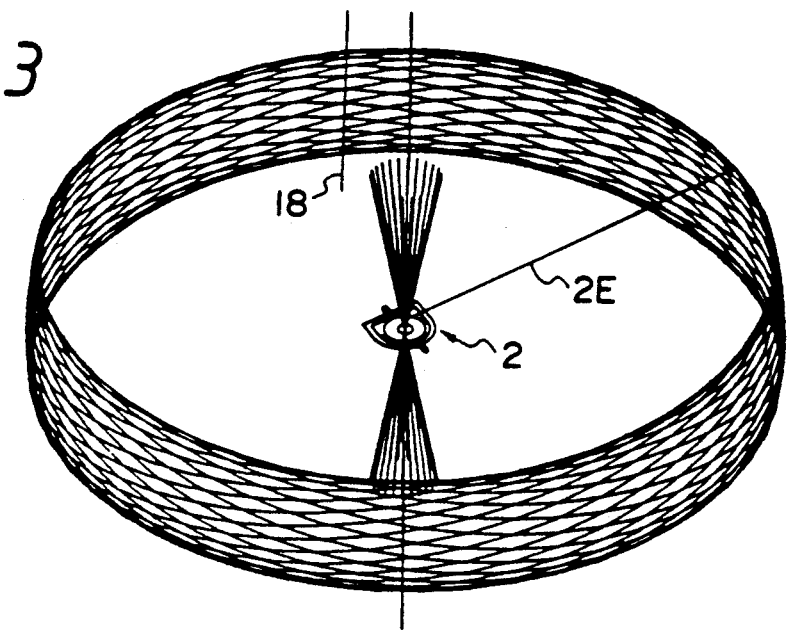
FIG. 3 is a perspective view showing the light tracks of a light beam.

The light tracks of the light beam produced by the scanner 2 of the present embodiment are illustrated in FIG. 3 which shows a model of the light tracks drawn on a virtual cylindrical surface having a fixed radius and centering around the mirror 4.

As shown, the light beam 2E projected from the scanner 2 draws a mesh of light tracks on the virtual cylindrical surface because of the precessional motion of the central axis of rotation 8 of the mirror 4. In the present embodiment, the number of revolutions of mirror 4 in 2700 rpm and the number of precession cycles of the central axis of rotation 8 or the number of revolutions of shaft 22 is 90 rpm, and thus the mirror 4 itself rotates 30 times while the central axis of rotation 8 precesses once in the shape of a cone. That is, during one cycle, 30 light tracks cross any vertical line 18 on the cylindrical surface at various heights thereof.

Description will now be made of how easily the light beam is applied to the reflector during one precession cycle if the reflector is disposed at the position of the vertical line 18.

Figure 4:
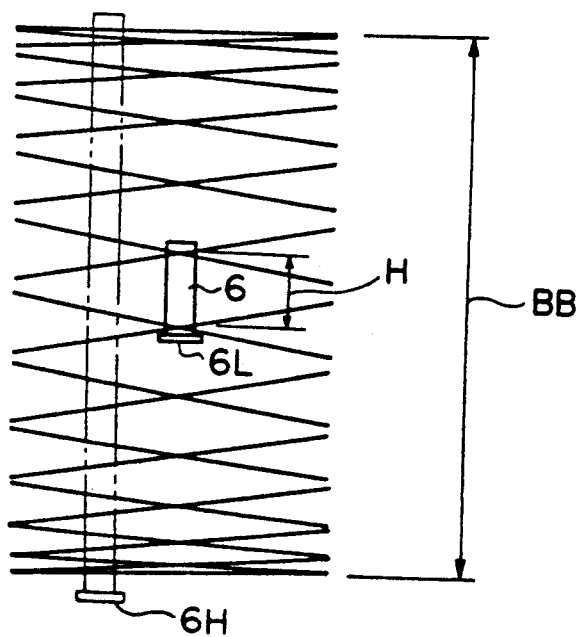
FIG. 4 is a diagram showing the relationship between the light tracks and retroreflector.

FIG. 4 shows an enlarged view of a part of the light tracks of FIG. 3. If the distance between the moving vehicle 1 and a reflector 6 is sufficiently short, the size of reflector 6 in the height direction is sufficiently long as compared with the variation width BB of the light tracks, as shown by 6H, and all the 30 light tracks will cross the reflector 6. On the other hand, if the distance between the moving vehicle 1 and the reflector 6 is very long, the size of reflector 6 in the height direction becomes relatively short with respect to the variation width BB of the light tracks as shown by symbol 6L. Even if the size of reflector 6 in the height direction is relatively short, at least one light track crosses the reflector 6 during one conical motion of the central axis of rotation 8 as long as the maximum vertical spacing H between two adjacent light tracks is smaller than the size of reflector 6 in the height direction 6L. Incidentally, only a model is shown in FIGS. 3 and 4 to avoid complexity and facilitate the plotting, and thus the number of illustrated light tracks are much less the actual ones.

A fundamental principle for detecting the position in the working area and the advance direction of the moving vehicle 1 on which the light scanning means is mounted in accordance with the present embodiment will be described hereinbelow.

Figure 5:
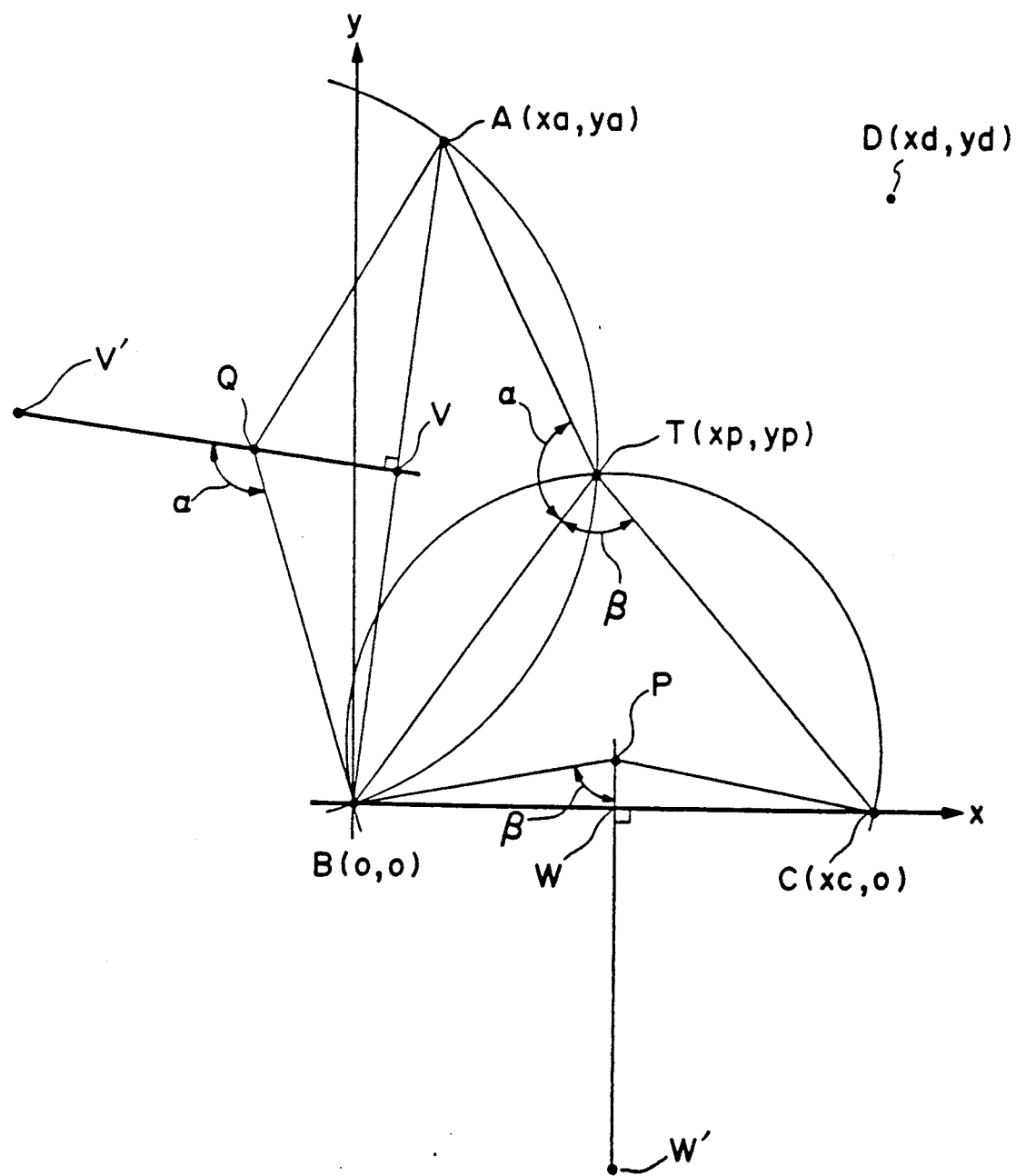
FIG. 5 is an explanatory view of the principle of calculating the position of the moving vehicle.
Figure 6:
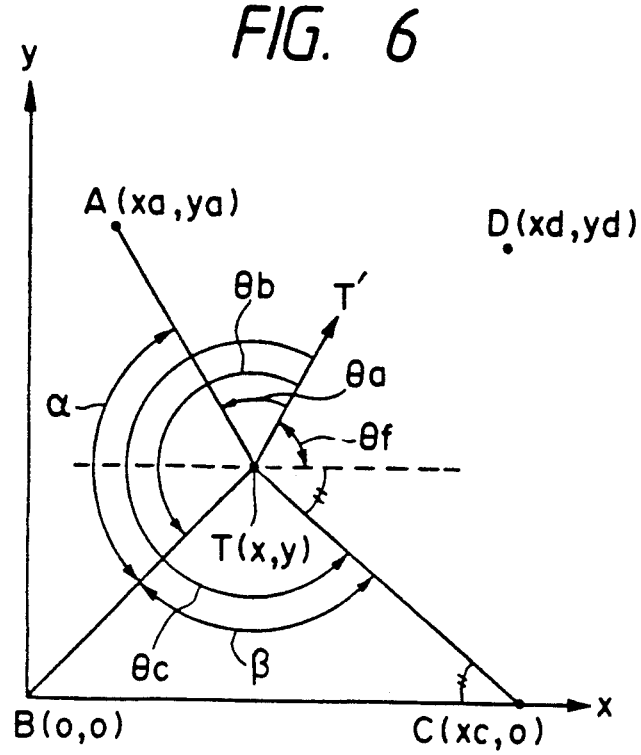
FIG. 6 is an explanatory view of the principle of calculating the advance direction of the moving vehicle.

FIGS. 5 and 6 are explanatory graphical representations each showing the positions of the moving vehicle 1 and those of the reflectors 6a–6d on an x-y coordinate system set in the working area of the moving vehicle 1.

In these figures, positions of the reflectors 6a–6d or points A, B, C and D, and the position of the vehicle 1 are represented by an x-y coordinate system wherein the reference point B is the origin, and a line extending between the reference points B and C is the x-axis.

As shown in FIG. 5, the position T of the moving vehicle is on a first circumscribed circle Q for a tri-angle ATB as well as a second circumscribed circle P for a triangle BTC. Accordingly, when two intersections of said two circumscribed circles Q and P are calculated, the position of the moving vehicle 1 is fixed. In this case, since one of said two intersections is the origin, the other intersection is the position T of the moving vehicle 1. The fundamental principle and the calculation equations are fully described in U.S. patent application Ser. No. 344,574 (now U.S. Pat. No. 5,011,288 issued Apr. 30, 1991) and U.S. Pat. No. 4,947,324.

Furthermore, the advance direction of the moving vehicle 1 is calculated as follows. In FIG. 6, assuming that an angle between the advance direction TT' of the moving vehicle 1 and the x-axis is 0f, the x-coordinate of the reference point C is xc, the coordinates of the moving vehicle 1 are (x,y), and the differential azimuth of the reference point C with respect to the advance direction TT' as reference is 0c, it gives the following equation.

$$\theta f = 360° - \tan^{-1}\{y/(xc-x)\} - \theta c \quad (1)$$

Figure 7:
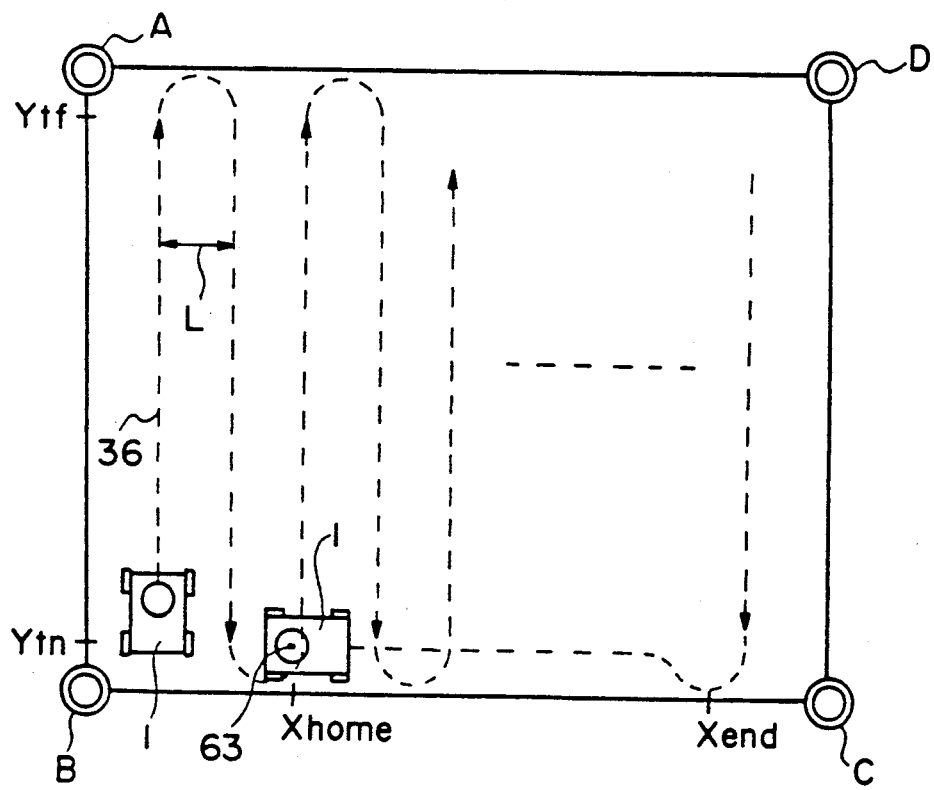
FIG. 7 is an illustration showing an arrangement of the traveling course of the moving vehicle and retroreflectors.

Next, steering control for the moving vehicle 1 based on the positional information found by aforementioned equation will be described hereinbelow. FIG. 7 is a schematic diagram showing a traveling course of the moving vehicle 1 and the coordinates of the reference points A, B, C and D.

It is supposed that the moving vehicle 1 starts to travel at a start position near reference point B, travels a predetermined traveling course 36, and returns to home position 63. The traveling course comprises straight traveling courses set in parallel with each other with a spacing L therebetween and turning courses for connecting any two adjacent straight traveling courses. After traveling a straight traveling course which is parallel with the y-axis, when the y-coordinate reaches Ytn or Ytf, the moving vehicle 1 travels along a turning course with a steering angle being fixed to a certain value and moves to the next straight traveling course. If the x-coordinate of a straight traveling course is equal to or exceeds the last x-coordinate Xend, it returns to the home position 63 along the last turning course after it has traveled said straight traveling course.

In FIG. 7, for simplicity of explanation, the individual reference points A, B, C and D are placed so that the straight lines connecting two adjacent points form a rectangle, and the straight traveling courses are made parallel with the line connecting reference points A and B or the y-axis, but the traveling course 36 can freely be established as long as reference points A–D are placed around the traveling course.

The control procedure is described with reference to flowcharts. The meanings of various parameters (symbols) used in the flowcharts to be referred to are as follows.

$\theta(n)$ . . . Azimuth determined on the basis of the light reception signal $\theta q(n)$ . . . Predicted azimuth $Cg(i)$ . . . Number of light reception times in detection block i $Am(i)$ . . . Detected azimuth at detection block i $Cp(n)$ . . . Number of light reception times at reference point n $Ap[n, I]$ . . . Light reception azimuth of reference point n $As[n, I]$ . . . Precession direction when reference point n is detected.

$Cm[n, I]$ . . . Counter value of the number of revolutions of the mirror when reference point n is detected.

$Aps(k)$ . . . Azimuth representative of a detection block in which the number of light reception times is equal to or larger than the threshold value.

$Aps(n)$ . . . Azimuth when $Aps(k)$ is set at $n=1-4$ in ascending order.

i . . . Detection block number j . . . Number of detection blocks in each of which the number of light reception times is equal to or larger than the first threshold value.

k . . . Number of detection blocks in each of which the number of light reception times is equal to or larger than the second threshold value.

I . . . Number representing the store order of the precession directions when mirror 4 has been rotated a predetermined number of times to detect reference point n.

J . . . Number of continuous detection times of reference point n when mirror 4 is rotated a predetermined number of times.

K . . . Maximum number of continuous detection times of reference point n when mirror 4 has been rotated a predetermined number of times.

e . . . Last number of the numbers representing the store order of the precession directions when the maximum number of continuous detection times occurs.

$Asc(n)$ . . . Precession direction in which reference point n can be captured with a high probability.

Ac(n) ... Azimuth determined on the basis of a light reception signal in a straight traveling process.

θt(n) ... Turn release angle of reference point n for ceasing a turn.

The reflected light reception process which is a basis of steering control is now described. The light reception process of a reflected light is performed as follows in the present embodiment.

Figure 8:
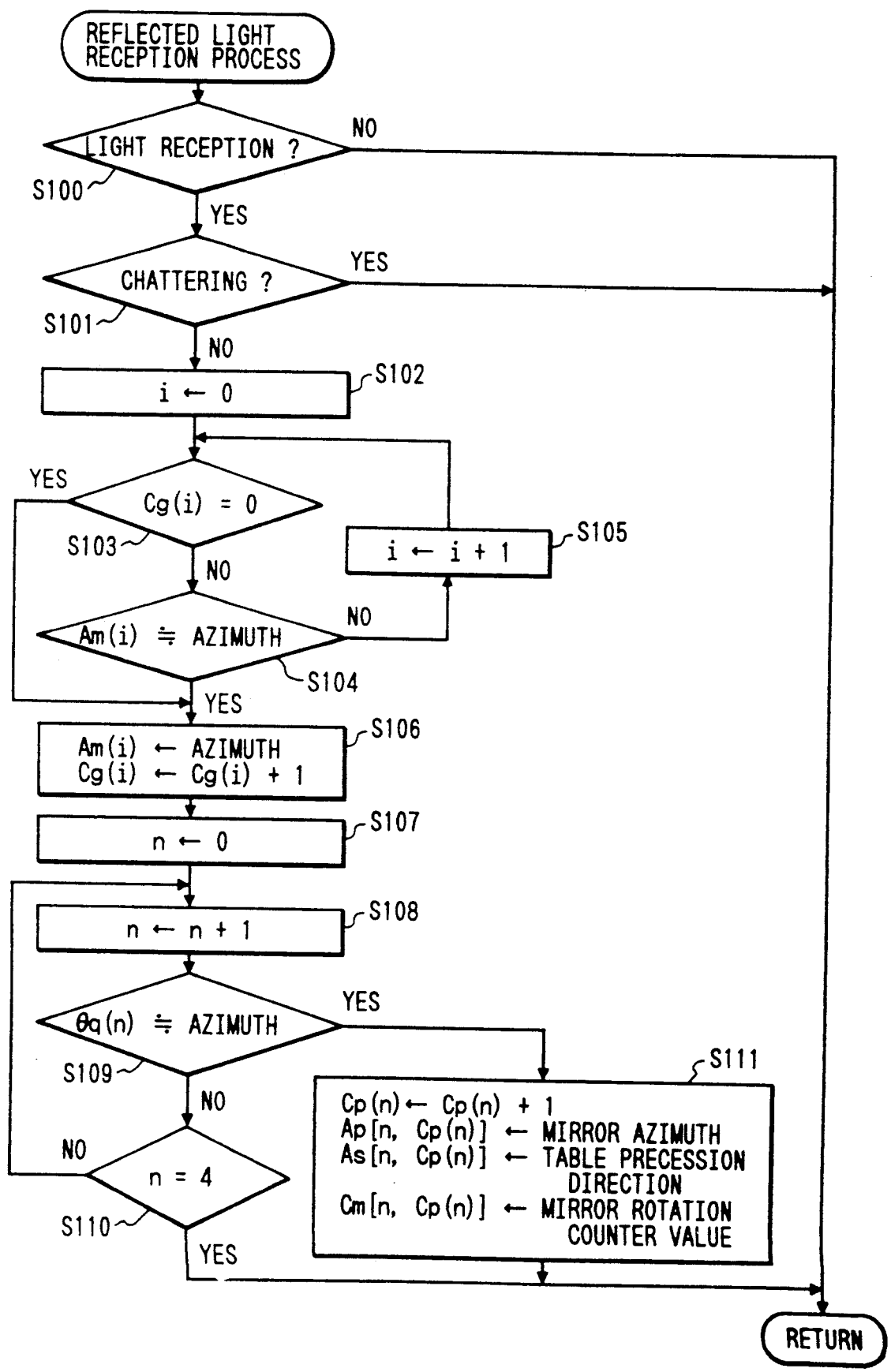
FIG. 8 is a flowchart of the processing of reflected light reception.

FIG. 8 is a flowchart showing the control procedure of the reflected light reception process.

In step S100, it is determined whether or not a light signal has been detected by a light beam receiver. If a light signal has been detected, the procedure goes to step S101. At this point, however, it cannot be discriminated whether the detected light is light reflected by one of the reflectors 6a–6d.

In step S101, it is determined if the detection of signal is a quasi signal detection due to chattering on the basis of the rotational angle of mirror 4 after the previous processing. That is, if a light signal is detected again when mirror 4 has rotated only a very small angle, it is deemed to be chattering and the latter detected light signal is ignored. If it is not chattering, step S102 is entered.

In step S102, "0" is set in a variable "i" representing the number of a detection block. In the present embodiment, the mirror 4 rotates 30 times while the central axis of rotation 8 makes one rotation in a conical locus. That is, a rotational scan is performed 30 times while the central axis of rotation 8 rotates once in a conical locus. It is possible that the light reflected by the same reflector is received a plurality of times during the 30 rotational scans. Detection data on a plurality of light signals incident upon the receiver from substantially the same direction are collected into one group and stored as the data of the same single reflector. This group is called a detection block. In consequence, if only the lights from the predetermined four reflectors 6a–6d are detected, then the number of the detection blocks is four and coincides with the number of the located reflectors.

In step S103, it is determined whether or not the number of light reception times Cg(i) in the detection block (i) is "0". Since "0" has been set in the parameter "i" in step S102, it is determined first whether or not the number of light receptions in the detection block of a detection block No. 0 is "0", that is, it is determined whether or not it is the first signal detected in this detection block.

This determination is positive in the first processing and control jumps to step S106, where the mirror angle, or the azimuth at which light was detected, is stored. The azimuth currently detected is stored as an azimuth Am(i) representative of the detection block (i), and the value of light receptions Cg(i) in the detection block (i) is incremented.

In step S107, the value "n" of a counter for identifying reference points is cleared. In the present embodiment, the counter values "1" to "4" correspond to the reference points A to D, respectively. In step S108, the counter value "n" of the counter is incremented.

In step S109, it is determined whether or not the azimuth currently detected is substantially the same as the predicted azimuth θq(n) established in an initial pole discrimination process or forward straight traveling process to be described later. Since the counter value "n" became "1" in step S108, it is determined whether or not the predicted azimuth and the detected azimuth of reference point A corresponding to the counter value "1" are substantially in coincidence.

Although the predicted azimuth θq(n) may be obtained by, for instance, adding a predicted amount of change α to the azimuth of the current detection, the azimuth itself latest detected may be used as the predicted azimuth without any hindrance in practical use because the reception interval of the reflected lights must be short as compared with the movement of moving vehicle 1, and the processing is also simple.

If the determination in step S109 is negative, it is determined in step S110 whether or not the counter value "n" is "4". The processings in steps S108 and S109 are repeated until the determination in step S110 becomes positive, determining whether or not the predicted azimuth of any reference point A-D coincides with the detected azimuth corresponding thereto.

If the predicted azimuth θq(n) substantially coincides with the detected azimuth, step S109 is positive and the flow advances to step S111. In step S111, the number of light reception times Cp(n) of the reference point represented by the counter value "n" is incremented because it is deemed that a predetermined reference point has been detected.

Further, in step S111, the detected azimuth Ap[n, Cp(n)] of the reference point, the inclination or precession direction As[n, Cp(n)] of the central axis of rotation 8 of the mirror 4 and the rotation counter value Cm[n, Cp(n)] of the mirror 4 are stored. The rotation counter value of the mirror 4 is a value which indicates how many degrees mirror 4 has rotated from the reference precession direction based on the output signal of the sensor 33.

If, in step S103, it is determined that the number of light reception times Cg(i) in the detection block (i) is not "0" or it is not the first light reception in that block, the procedure goes to step S104. In step S104, it is determined whether or not the detected azimuth substantially coincides with the azimuth Am(i) of the light signal previously detected in the detection block (i). If both are coincident, the procedure flows to step S106, where the representative azimuth Am(i) of the detection block (i) is renewed with the azimuth latest detected and the number of light reception times Cg(i) is incremented.

If the determination in step S104 is negative, or the azimuth Am(i) of the previously received light signal in the detection block (i) is not coincident with or similar to the latest detected azimuth, indicating that it is a light from another detection block, the procedure goes to step S105 where the detection block number (i) is incremented. After incrementing the detection block number (i), in step S103, it is determined as to the incremented detection number (i) whether or not it is the first light reception.

Based on the azimuths of light reception signals or the azimuths of reference points stored by the reflected light reception process, the position and advance direction of the moving vehicle 1 are calculated as described later, whereby steering control of the moving body is performed.

Figure 9:
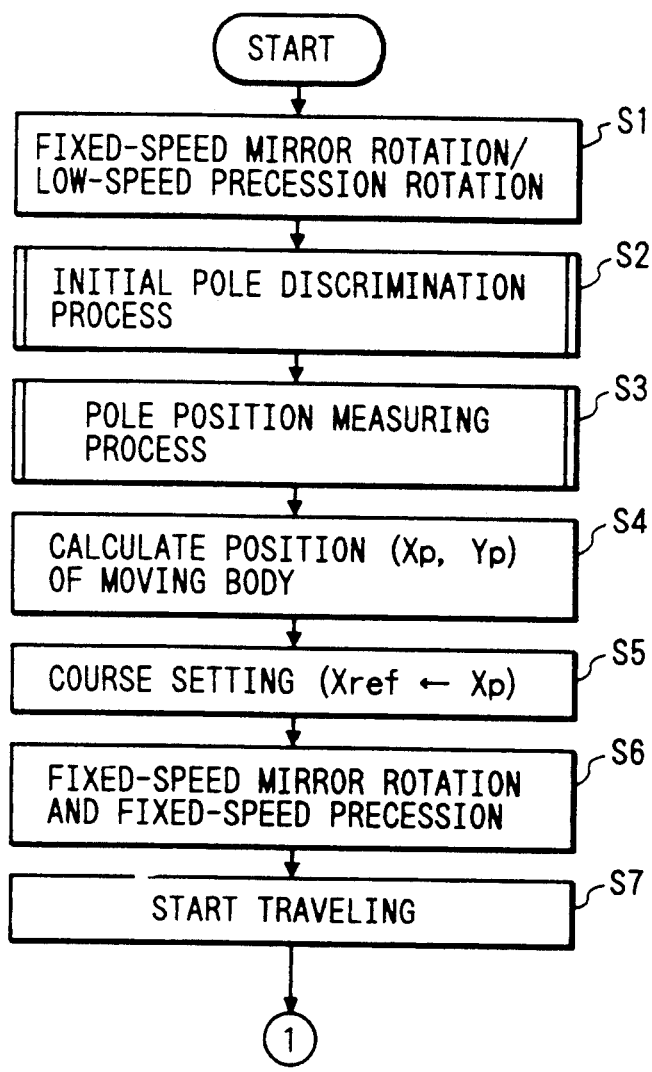
FIGS. 9 and 10 taken together are a flowchart showing the steering control of the moving vehicle.
Figure 10:
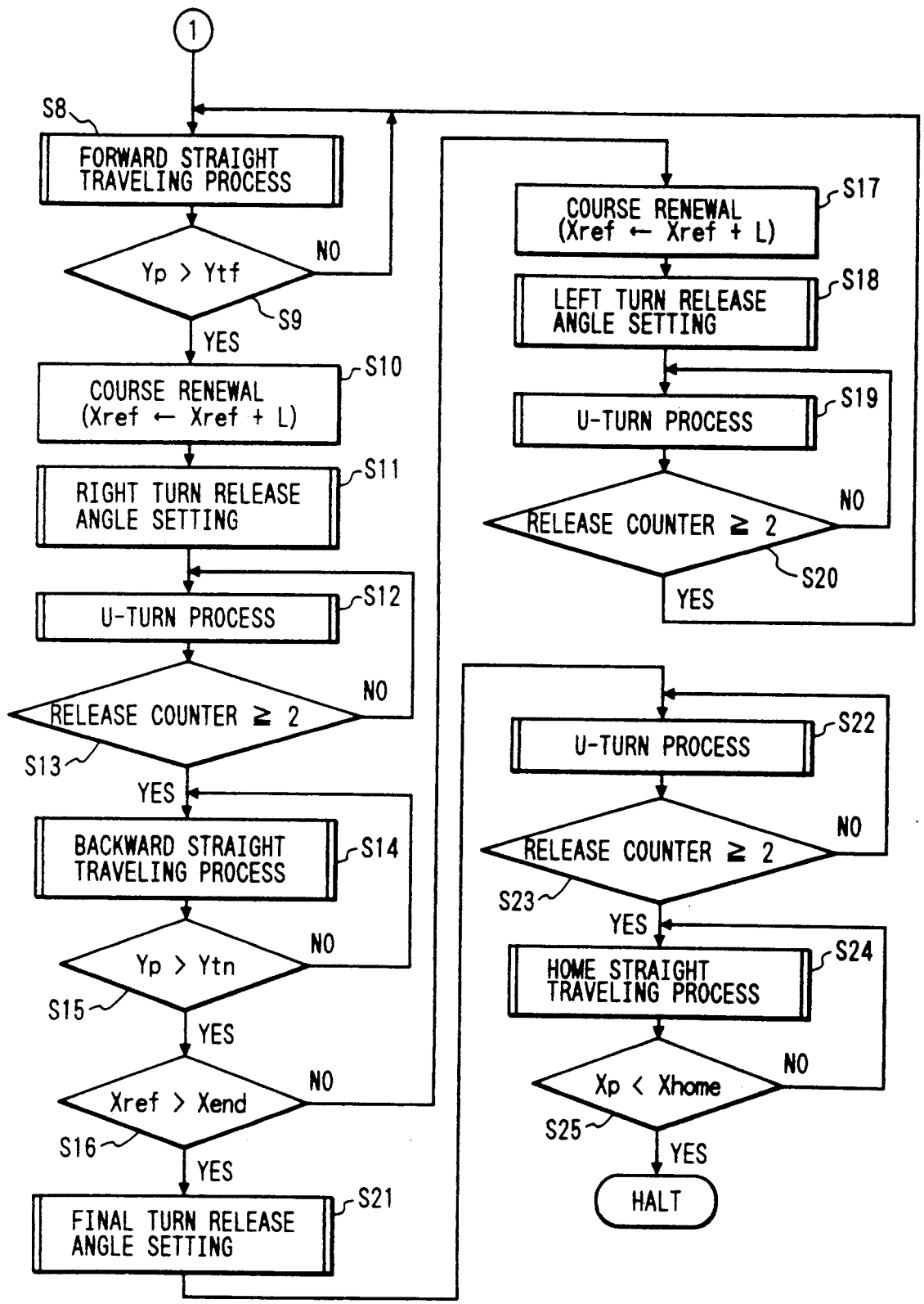

FIGS. 9 and 10 taken together are a general flowchart showing the steering control in the embodiment of the present invention.

In step S1, the motors 5 and 15 are started up to rotate the mirror 4 and a gimbal precession mechanism is operated so that its central axis of rotation 8 draws a conical locus. Here, the motor 15 is driven at a comparatively low speed so that the light beam can surely be applied to reflectors 6a–6d set at reference points A–D, respectively.

In step S2, an initial pole discrimination process, including a reflected light reception process, for deciding the initial azimuth of the reference point A–D or reflector 6a–6d is performed. The detail of these processes are described later with reference to FIGS. 11 and 12.

In step S3, a pole position measuring process is performed in which the respective distances from the moving vehicle 1 to the reference points A–D are measured and the positions of the respective reference points, namely, the reference coordinate values in an x-y coordinate system are calculated. This process is detailed later with reference to FIGS. 13, 14 and 15.

In step S4, the current position coordinates (Xp, Yp) of the moving vehicle 1 are calculated on the basis of the azimuth and coordinate values of the reference point calculated in steps S2 and S3.

In step S5, the current x-coordinate Xp of the moving vehicle 1 is set as the x-coordinate Xref of the first straight course. However, said setting of the x-coordinate is made on the assumption that the moving vehicle 1 is at the start position of traveling.

In step S6, the motors 5 and 15 are rotated at their respective preset speeds to rotate and incline the mirror 4.

In step S7, the rotation of the engine of the moving vehicle 1 is connected to the driving wheels to start the traveling.

Step S8 is a forward straight traveling process in which the moving vehicle 1 travels in the direction in which the y-coordinate value increases.

Self-position (Xp, Yp) and advance direction θf are calculated on the basis of the azimuth obtained by the reflected light reception process. And, the difference between those values and the preset traveling course is calculated, and control for changing the steering angle of the steering wheel of moving vehicle 1 is performed so as to decrease the difference. Since this process is not directly related to the present invention, a detailed flowchart of it is omitted.

In step S9, it is determined whether or not the forward traveling of the first straight course has been finished, depending on whether or not the current y-coordinate Yp of the moving vehicle 1 has exceeded a predetermined Ytf of y-coordinate. If it is determined that the moving vehicle 1 has completed the forward traveling of the straight traveling course, the process advances to step S10.

In step S10, the next straight traveling course is set by adding the distance L to the adjoining straight course to the current x-coordinate Xref of the straight traveling course.

In step S11, a right turn release angle setting process is performed for setting an azimuth for terminating the traveling along a turning course. In the right turn release angle setting process, the azimuth or right turn release angle for each reference point for terminating the U-turn process to be performed in the next step is calculated.

In step S12, a U-turn process is performed in which moving vehicle 1 is caused to travel in the right direction with a fixed turning radius while fixing the steering angle of the moving vehicle 1 at a predefined value. Since the processings in steps S11 and S12 are also not directly related to the present invention, detailed flowcharts of them are omitted.

In step S13, it is determined whether or not "1" has been exceeded by the value of a release counter for counting the number of reference points (counted in the process of FIG. 19) whose azimuth seen from the moving vehicle 1 has reached a predetermined right turn release angle. If the determination is positive, the process goes to step S14, judging that a turning course has been finished.

In step S14, a backward straight traveling process is performed in which the moving vehicle 1 is allowed to travel in the direction in which its y-coordinate decreases. Since the backward straight traveling process is similar to the forward straight traveling process of step S8, the detailed description of it is omitted.

In step S15, it is determined whether or not the moving vehicle 1 has completed the traveling of the backward straight traveling course, depending on whether or not the current y-coordinate Yp of the moving vehicle 1 is smaller than the predetermined y-coordinate Ytn.

In step S16, it is determined whether or not the current x-coordinate Xref of the straight course has exceeded the x-coordinate Xend at which the traveling is expected to stop.

In step S17, the next straight traveling course is set, when the judgement in step 16 is negative.

In step S18, a left turn release angle setting process is performed for setting an azimuth for terminating a leftward turning course. This process is same as the right turn release angle setting process except that only the later described setting value of release angle is different.

In step S19, a U-turn process is performed. This process is similar to the U-turn process of step S12.

In step S20, it is determined whether or not the value of the release counter has exceeded "1". If this determination is positive, control returns to step S8, judging that the traveling of a turning course has been ended.

In addition, if the determination in step S16 is positive, the process advances to step S21. The determination in step S16 becomes positive when the traveling of all the straight traveling courses has been completed, and in step S21, a process is performed for setting the release angle for the last turning course. This process is similar to the right turn or the left turn release angle setting, and thus the description of details are omitted.

In step S22, a U-turn process is performed, and in step S23, it is determined whether or not the value of the release counter has exceeded "1".

In step S24, a process is performed for causing the moving vehicle 1 to travel the straight traveling course for returning to the home position 63. This process is similar to the forward or backward straight traveling process, and thus the explanation of it is omitted.

In step S25, it is determined whether or not the current x-coordinate Xp of the moving vehicle 1 has become smaller than the x-coordinate Xhome of the home position 63. If this determination is positive, the procedure ends, judging that the moving vehicle 1 has returned to the home position 63.

Although, in the above description, a right turn is made after the first straight course, in fact, a left turn may be made after the first straight traveling course. In this case, it is only needed to exchange S9 and S11 with S15 and S18 in FIG. 10.

Figure 11:
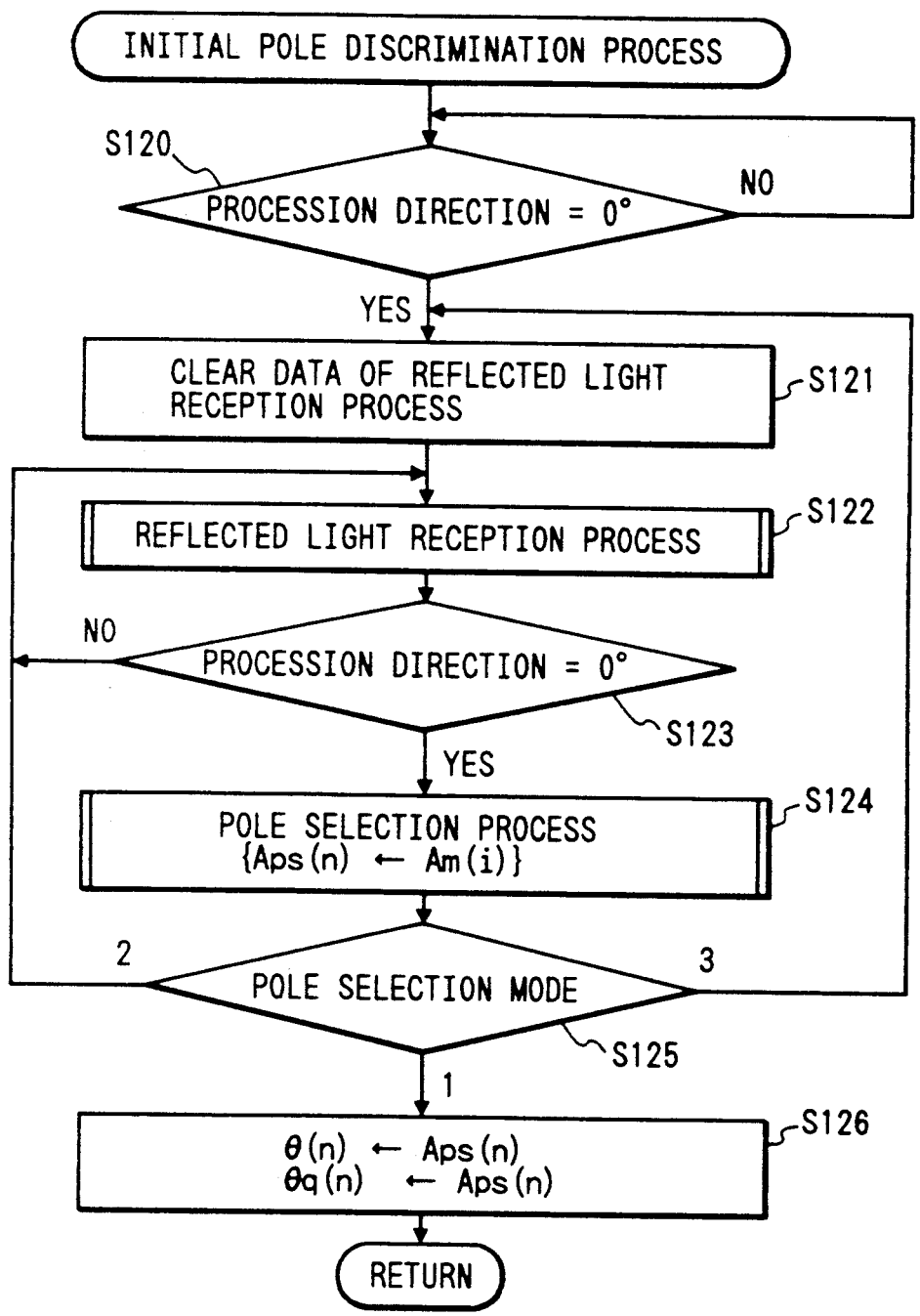
FIG. 11 is a flowchart of the processing of discriminating the initial pole.

Now, the initial pole discrimination process in the step S2 will be described in detail. FIG. 11 is a flowchart of the initial pole discrimination process, and FIG.

12 is a flowchart of the pole selection process performed in the initial pole discrimination process.

The initial pole discrimination process repeatedly performs the reflected light reception process until the number of detection blocks which have been detected a predetermined number of times or more coincide with the number of all the reflectors disposed, thereby determining the reflectors or reference points. That is, the detected azimuths Am(i) representative of the detection blocks are determined as the azimuths of the reference points.

In step S120, it is determined whether or not the precession direction becomes "0°", or whether or not the predetermined reference position of the thin disk 24b has been detected by the sensor 33 for detecting the precession reference. If it is determined that the predetermined reference position has been detected and the precession direction has becomes "0°", the process goes to step S121.

In step S121, the data obtained by the previous reflected light reception process is cleared.

In step S122, the reflected light reception process shown in FIG. 8 is performed. Since, in the reflected light reception process in the initial pole discrimination process of FIG. 11, no predicted azimuth θq(n) has been decided yet, only the process steps corresponding to steps S100 to S106 in FIG. 8 are executed.

In step S123, it is again judged whether or not the precession direction is "0°", that is, one cycle of precession during which the center axis of rotation 8 draws a conical surface has been finished. The reflected light reception process (step S122) is continued till the end of said one cycle, and the process flows to step S124 when said one cycle has terminated.

In step S124, a reference point selection process (pole selection process) is executed. In this selection process, four detection blocks in each of which the number of light reception times Cg(i) is larger are selected out of the detection blocks detected in the reflected light reception process, and then the azimuths Am(i) representative of those detection blocks which have been selected are set in Aps(n) in ascending order.

In the present embodiment, n=1 to 4 because the reference points are four, A to D. As already described with respect to the reflected light reception process shown in FIG. 8, the detected azimuth Am(i) representative of a detection block is the newest one of the azimuths detected in the particular detection block. By using the newest data in this way, the storage capacity of the memory for storing the azimuths can be saved.

In step S124, a pole selection process for deciding a pole selection mode "1" to "3" which is used for the decision in the next step S125, is performed. The pole selection process is described in detail in conjunction with FIG. 12.

In step S125, it is determined which pole selection mode "1" to "3" has been decided in the pole selection process.

If the pole selection mode is "1", the procedure flows to step S126 because all the four reference points and their azimuths have been detected. In step S126, as the azimuths θ (n) of the reference points n (n=1 to 4), the azimuths Aps(n) obtained in the process of step S124 are set. If the pole selection mode is "2", the procedure goes back to step S122 to continue the reflected light reception process since the number of blocks in each of which the number of light reception times Cg(i) having exceeded a predetermined number has not yet reached a predetermined value (=4), that is, four reference points have not been selected yet.

If the pole selection mode is "3", then there are five or more detection blocks in each of which the number of light reception times Cg(i) is equal to or larger than the predetermined value because of, for example, existence of reflecting objects other than expected. This means that the reference points could not be identified from the detection blocks, and thus the flow goes back to step S121 to redo the initial pole discrimination process.

Figures 18, 19:
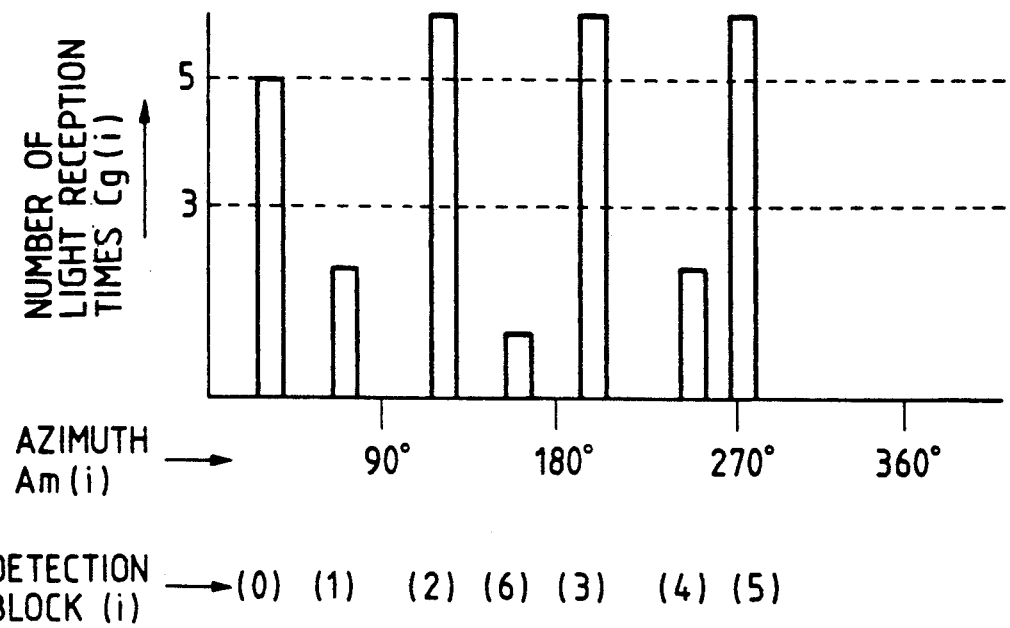
FIG. 18 is a graph showing the azimuth and the number of light receptions for each detected block.
FIG. 19 is a representation showing data of the number of revolutions of the mirror and precession directions when a reference point is detected.

FIG. 18 shows an example of the data obtained in the reflected light reception process (S100–S106) in the initial pole discrimination process. In the initial pole discrimination process the reference point discrimination process is performed on the basis of the light reception data stored during one precession of the central axis of rotation 8, or during 30 rotations of the mirror 4. FIG. 18 shows an example of the light reception data stored while mirror 4 rotates 30 times.

In the same figure, the ordinate is the number of light reception times Cg(i) in the detection block (i), and the abscissa is the azimuth Am(i) of the detection block (i). As shown, the number of detection blocks is seven (i=0 to 6), which means that light signals were received from seven directions during 30 rotations of the mirror 4. For a detection block in which the number of light reception times Cg(i) is plural, the azimuth Am(i) is the newest detected data as described above. The detection numbers (i) do not always appear in ascending order, because the numbers are assigned in order of light reception.

Figure 12:
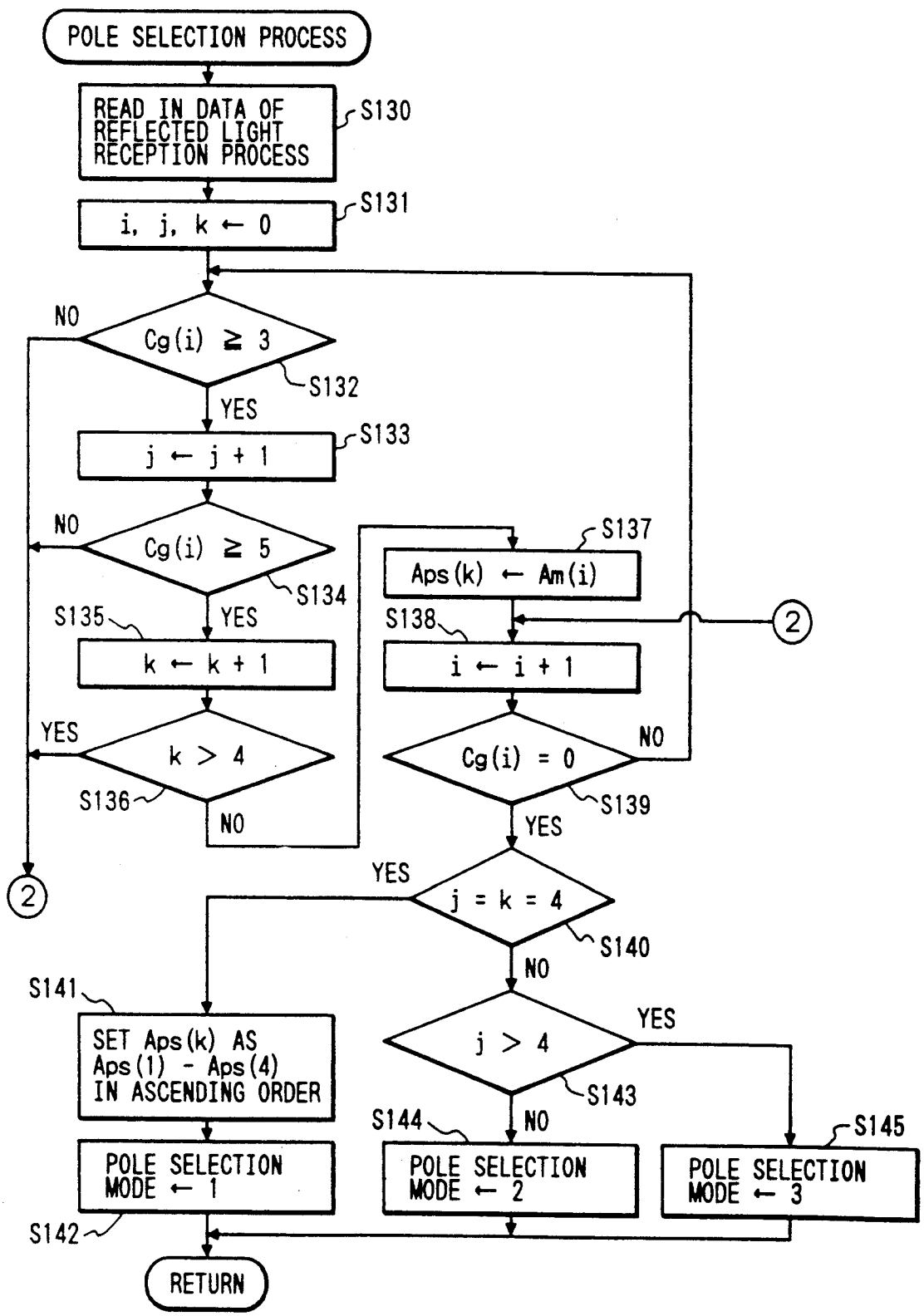
FIG. 12 is a flowchart of the pole selection process.

Referring to the light reception data, the pole selection of the step S124 is now described in detail with reference to FIG. 12 which is a flowchart of the pole selection process. In the pole selection process, the detection blocks in each of which the number of light reception times Cg(i) has reached the predetermined threshold value are picked out, and it is determined whether the number of detection blocks which were picked out coincides with the number of predetermined reference points, "4". If they are in coincidence, it is decided that the light reception data of the detection blocks are on the predetermined reference points A-D. If the number of extracted detection blocks is larger than the number of reference points, it is judged that the reference points cannot be identified and the data sampling is redone. If the number of the extracted detection blocks is smaller, the data sampling is further continued.

In the example of FIG. 18, two threshold values, "3" and "5", were set. The number of detection blocks in each of which the number of light reception times Cg(i) has reached the first threshold value, "3", is stored in a parameter "j", and the number of detection blocks having reached the second threshold value, "5", is stored in a parameter "k". And, based on the parameters "j" and "k", it is determined whether a reference point can or can not be identified.

First, in step S130, the data obtained in the reflected light reception process, namely, the light detection azimuth Am(i) and the number of reflected light reception times Cg(i) are read in.

In step S131, the parameters "i", "j" and "k" are cleared.

In step S132, it is determined whether or not the number of reflected light receptions in a particular detection block is equal to, or greater than three. If it is affirmative, the procedure advance to step S133, and increment the parameter "j" representing the number of detection blocks in each of which the number of light reception times Cg(i) is equal to, or greater than three.

In step S134, it is determined whether or not it is a detection block in which the number of light reception times Cg(i) is equal to, or greater than five. If it is affirmative, step S135 is entered to increment the parameter "k" representing the number of detection blocks which have received a light beam equal to, or more than five times.

In step S136, it is determined whether or not the value of the parameter "k" is greater than "4". In other words, it is determined whether or not the number of detection blocks in each of which of light reception times Cg(i) has exceeded five is greater than four that is the total number of the predetermined reference points.

If the judgement in step S136 is negative, then in step S137, the detected azimuth Am(i) representative of the detection block in which the number of light reception times Cg(i) has exceeded five is stored as azimuth Aps(k) for one of the predetermined reference points.

In step S138, the number "i" representing a detection block is incremented. In step S139, it is determined whether or not the number of light reception times Cg(i) is "0". If the number of light reception times Cg(i) is not "0", there are still remaining detection blocks in each of which the number of light reception times is stored, and thus the procedure returns to step S132. If the number of light reception times Cg(i) is "0", then it is determined that there is no other block left, and the flow advances to step S140.

In step S140, it is determined whether or not both parameters "j" and "k" are "4", that is, whether or not the number of detection blocks having received a light beam three or more times and the number of detection blocks having received a light beam five or more times are both four. If the determination is positive, it is judged that both detection blocks are the same and the azimuths Am(i) stored correspondingly to these four detection blocks are the azimuths of reference points A to D.

If step S140 is positive, step S141 is entered, where the detected azimuths Aps(k) stored in step S137 are set as azimuths Aps(1)–Aps(4) in ascending order. In step S142, the pole selection mode is set at "1".

If the determination in the step S140 is negative, the flow goes to step S143 where it is detected whether or not the parameter "j" is greater than "4", or whether or not there are more than four detection blocks which have received a light beam three or more times. If step S143 is negative, the pole selection mode is set at "2" in step S144, and if positive, the pole selection mode is set at "3" in step S145. According to these pole selection modes, the determination of step S125 in the initial pole discrimination process of FIG. 11 is performed.

For instance, in the example light reception data shown in FIG. 18, the azimuths of the detection blocks (i=0, 2, 3, 5) in each of which the number of light reception times Cg(i) is equal to or greater than five are recognized to be the azimuths of the predetermined reference points.

Now, description will be made of a process for determining the coordinates of reference points, which is required for the pole position measuring process shown in step S3 in FIG. 9. First, a description will be made of a process for determining the pole capture precession direction, which is to determine an inclination direction of the central axis of rotation 8 having a high probability of applying a light beam to each reference point. The process for determining the pole capture precession direction is summarized as follows.

FIG. 19 shows an example of the light reception data on a reference point A (n=1) detected in the reflected light reception process included in the decision process of pole capture precession direction. In the same figure, light reception data is shown, which was detected during one precession cycle, or during 30 rotations of the mirror 4. In the present embodiment, the light reception data during one rotation of the central axis of rotation 8, or during 30 rotations of the mirror 4 is taken in as described later. The precession direction is represented by the rotation angle of encoder 35 (FIG. 1).

The parameter Cm indicates a rotation counter value when a reference point n is detected after the count has been started at the position of precession direction of "0°" as shown in FIG. 8, and in this case, the maximum of the parameter Cm is "30" since the light reception data during 30 rotations of the mirror 4 is sampled. The parameter "I" is a number representing the store order of precession directions when the reference point n is detected. That is, the maximum of the number "I" representing the store order is the number of light reception times Cp(n) of the reference point n.

In the process for determining the pole capture precession direction, groups in each of which the reference point n has been detected in a continuous series of cycles of the rotational scanning of the mirror 4, are picked out. For instance, the precession directions whose store number "I" is "1" and "2" as well as "3" to "6" are treated as the data of one group, respectively. Of such groups, the range of the precession directions in the group having the biggest number of continuous detection times is detected. And the middle value representative of the range is calculated. It is determined that the obtained middle value is a precession direction in which a light beam can be applied to the reference point n with a high probability. The middle value may be the mean value of all the precession directions of the same group or it may be the mean value of the maximum and minimum values. In the present embodiment, the mean value of the maximum and minimum values is calculated.

For instance, in FIG. 19, the counter value Cm continues for the store number "I" being "1" to "2" and "3" to "6", respectively, when the reference point n is detected, and the number of continuation times is larger for the store number "I" being "3" to "6". Accordingly, the reference point (pole) capture precession direction is decided by averaging the values of the precession directions for the store numbers "I" of "3" and "6". The averaged value is (108.6°+144.4°)/2°=126.5°.

Figure 13:
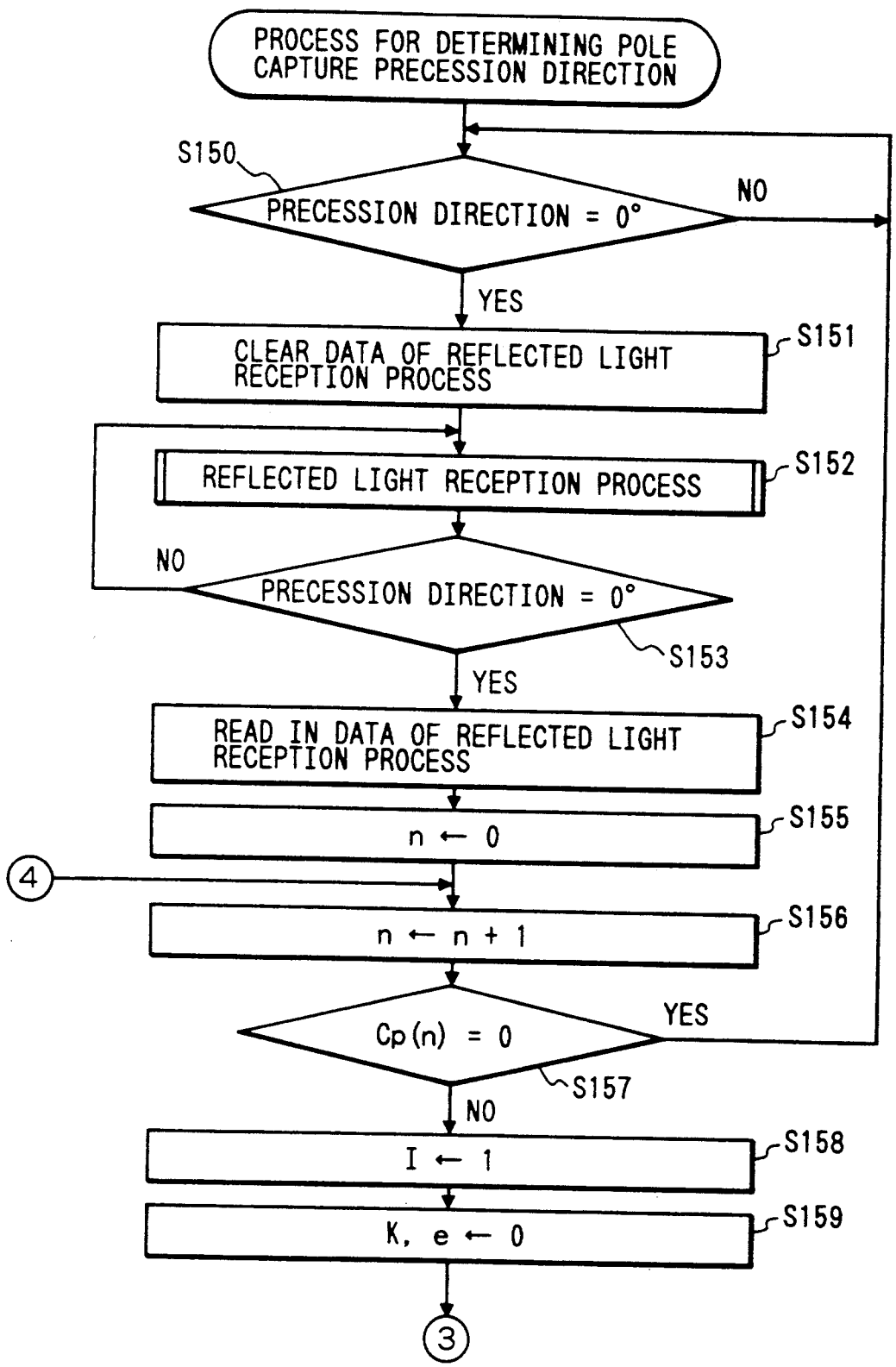
FIGS. 13 and 14 taken together are a flowchart of the decision processing of pole capture precession direction.
Figure 14:
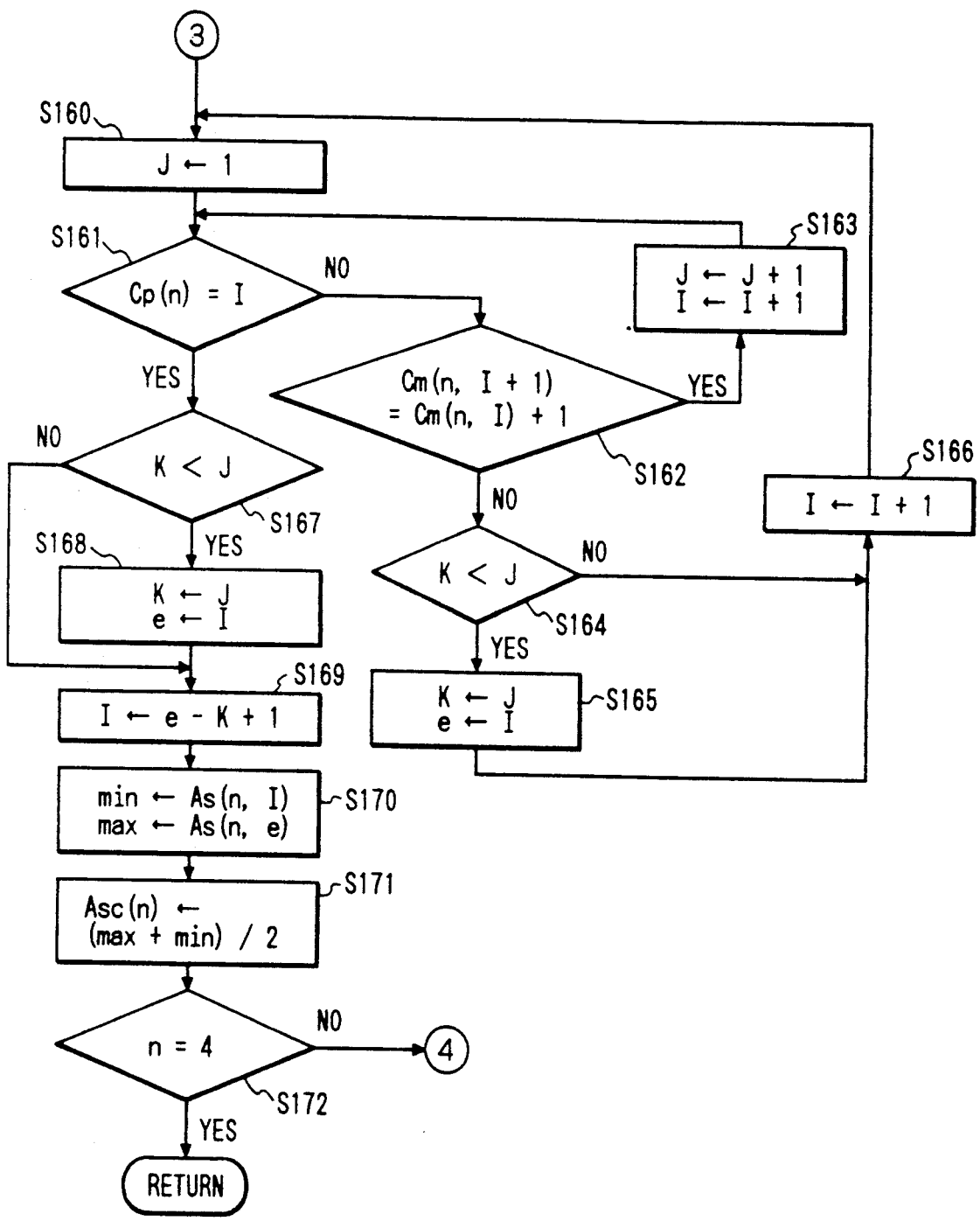

FIGS. 13 and 14 taken together are a flowchart of the process for determining the pole capture precession direction.

In FIG. 13, in step S150, it is determined whether or not the precession direction has become "0°". If the precession direction has become "0°", the process goes to step S151. In step S151, the data obtained by the previous reflected light reception process is cleared. In step S152, the reflected light reception process described in conjunction with FIG. 8 is newly performed.

In step S153, it is determined whether the precession direction has become "0°" for the second time, or whether one cycle of the precession scanning has been performed. Thus, the reflected light reception process is continued for one cycle of the precession during which the data of light reception is stored.

If the determination in the step S153 is affirmative, the flow goes to step S154 where the data obtained in step S152 or step S111 (FIG. 8) of the reflected light reception process is read in. In step S155, a discrimination counter "n" of a reference point is cleared.

In step S156, the counter "n" is incremented. In step S157, it is determined whether or not the parameter Cp(n) is "0", which Cp(n) represents how many times the reference point "n" indicated by the counter "n" has been detected, thereby to determine whether or not the reference point "n" has ever been detected. If the answer is positive, the process goes back to step S150, and light reception data is again sampled.

If step S157 is negative, the process advances to step S158 where "1" is set in the parameter "I". The parameter "I" is a number for identifying the order of storing the precession directions in which the reference point "n" could be detected, as described above.

In step S159, the parameters "K" and "e" are cleared. The parameter "K" indicates the maximum number of continuous detection times when the light signal has been detected at the substantially same direction each time the mirror 4 makes one rotation. The parameter "e" represents the store number of the last oscillation direction of the store numbers "I" of oscillation directions when light signals have been continuously detected.

In FIG. 14, in step S160, "1" is set in the value "J" of the counter for counting the number of continuation times of light reception signals.

In step S161, by determining whether or not the parameter Cp(n) representing the number of detection times of the reference point n equals to the parameter "I" representing the store number of precession directions, it is determined whether or not all the stored light reception data have been checked.

Usually there are existing a plurality of light reception data, and since the number "I" was set to "1" in step S158, the determination in step S161 is negative first and it is determined that all the light reception data have not completely checked, and the procedure goes to step S162.

In step S162, as to the rotation counter value Cm of the mirror 4, it is determined whether or not the counter value Cm(n, I+1) at the current detection equals a value obtained by adding "1" to the counter value Cm(n, I) at the last detection. That is, by checking the continuity of the counter value Cm, it is determined whether or not light signals have been continuously detected for each rotation of the mirror 4. If this determination is positive, the process advances to step S163 to increment the values of the counter "J" and the parameter "I", and returns to step S161.

On the other hand, if step S162 is negative, the process flows to step S164, where it is determined whether or not the counter "J" value is larger than the parameter K. If the determination is positive, the process goes to step S165, where the maximum number of continuous detection times "K" is renewed with the current number of continuous detection times "J", and the parameter "e" representing the store number of the last precession direction in the continuous detection of light reception signals is renewed with the store number "I" of the current precession direction.

In step S166, the store number "I" of precession directions is incremented.

If step S161 is positive, or it is determined that the checking of all the light reception data has been finished, the procedure goes to step S167. The description of steps S167 and S168 is omitted because they are the same processes as the steps S164 and S165.

In step S169, the first precession direction store number for the occurrence of the maximum number of continuous detection times is calculated and employed as the parameter "I".

In step S170, the data of the precession direction As(n, I) detected in the reflected light reception process, or of the precession direction stored correspondingly to the first store number for the occurrence of the maximum number of continuous detection times is set as the minimum value "min" of precession directions. In addition, As(n, e), that is, the data of the precession direction stored correspondingly to the last store number for the occurrence of the maximum number of continuous detection times is set as the maximum value "max".

In step S171, the mean value of the maximum value "max" and the minimum value "min" is calculated and stored as the precession direction Asc(n) for most surely capturing the reference point n. The precession direction Asc(n) for capturing the reference point "n" means a precession direction in which the reference point "n" can be detected with the highest probability.

In step S172, by judgment as to whether or not the counter value "n" is "4", it is determined whether or not the process for deciding the precession direction for capturing the reference point "n" has been completed for all the reference points. If step S172 is negative, the process returns to step S156 in FIG. 13, while if it is positive, the process returns to the main routine.

Figure 15:
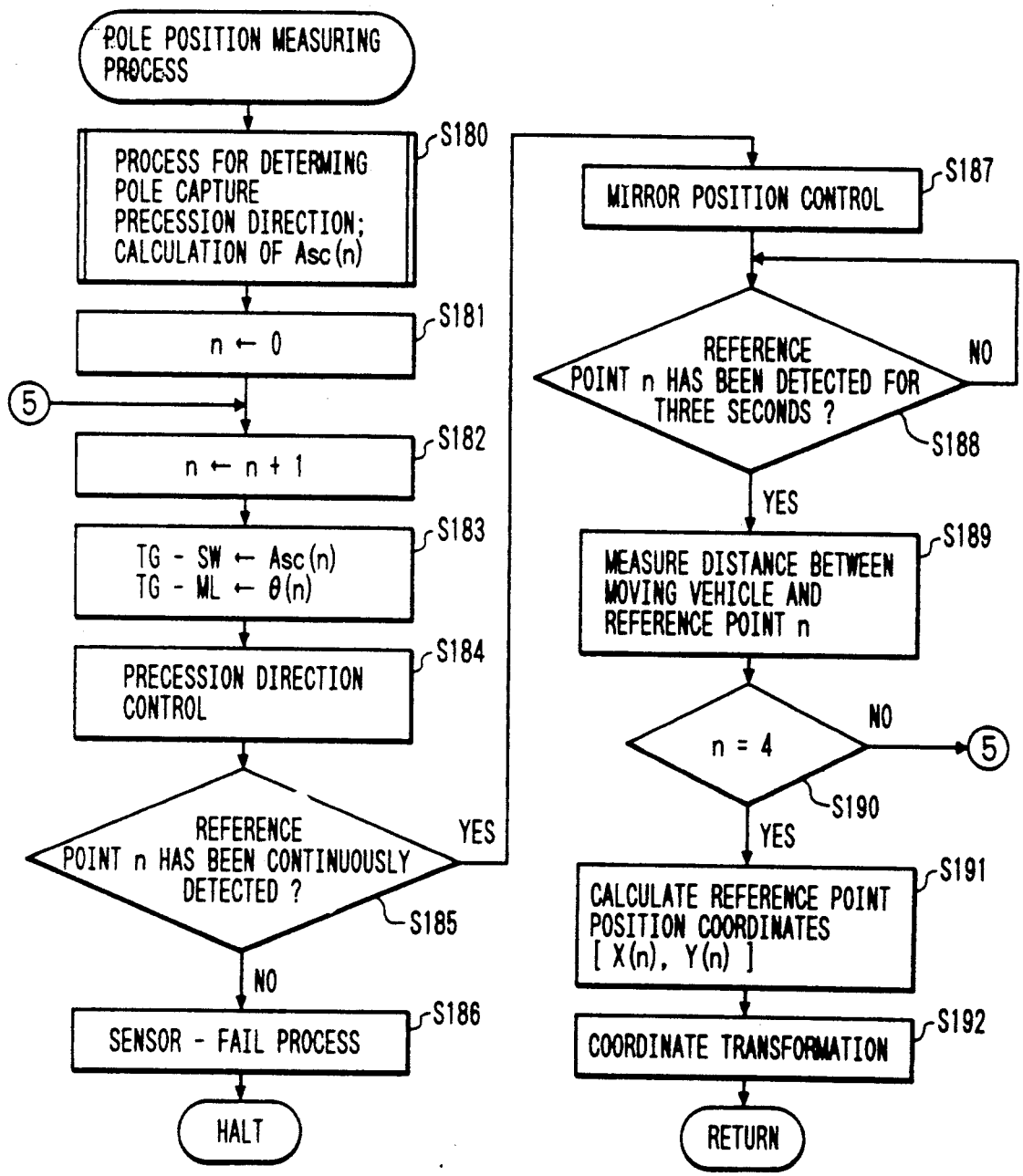
FIG. 15 is a flowchart of the processing of measuring the pole position.

A process is now described for deciding the reference point coordinates in accordance with the precession direction for capturing the reference point "n" (reference point capture precession direction). FIG. 15 is a flowchart of the pole position measuring process for deciding the reference point coordinates.

In step S180, the above-mentioned process for deciding the precession direction for capturing a pole is performed.

In step S181, the value of the counter "n" for discriminating the reference point is cleared, and in step S182, the counter value is incremented.

In step S183, the precession direction Asc(n) obtained in the process for deciding the precession direction for capturing the pole is set as the capture precession direction TG-SW for the reference point "n", and the azimuth θ(n) obtained in the initial pole discriminating process is set as the capture azimuth TG-ML for the reference point "n".

In step S184, a precession direction control is made for setting the precession direction at the precession direction TG-SW for capturing the reference point "n". The precession direction control is performed on the basis of the value of the encoder 35 for detecting the rotation of precession motor 15, for fixing the inclination direction of the central axis of rotation 8 at the capture precession direction TG-SW of the reference point "n". When the inclination of the central axis of rotation 8 is fixed, the rotational scanning surface drawn by light tracks is fixed to a specific one plane.

In step S185, it is determined whether or not the reference point n is continuously detected each rotation of the light track with the rotational scanning plane being fixed. If this determination is negative, it is judged that there is an abnormality such as failure of the sensor, and a display informing of the abnormality is provided or a warning is issued (the sensor-fail processing of step S186), and this process is temporarily aborted.

On the other hand, if the reference point is detected each cycle of scan and the determination in step S185 is positive, the flow advances to step S187.

In step S187, a mirror position control process is performed for adjusting the azimuth of the mirror 4 at the capture azimuth TG-ML of the reference point "n". The mirror position control process is performed on the basis of the value of the encoder 7 which detects the rotation of the motor 5 for rotating the mirror, and the motor 5 is energized until the value of the encoder 7 substantially coincides with the capture azimuth TG-ML for the reference point "n". When the value of the encoder 7 substantially coincides with the capture azimuth TG-ML for the reference point "n", the motor 5 is deenergized and the electromagnet 16 is energized so that the motor 5 can maintain its stop condition at that stop position. This allows the attracting plate 34 to be attracted to the electromagnet 16 and the stop position of the motor 5, that is, of the mirror 4 is fixed.

In step S188, the light reflected from the reference point "n" is detected for three seconds or longer (in general, for a predetermined time). Of course, this time is not limited to three seconds, but it is only required that whether the direction of the mirror 4 has been surely fixed can be confirmed.

In step S189, the distance between the moving vehicle 1 and the reference point "n" is measured on the basis of the detection result of the light reflected from the reference point "n". This can be calculated, for instance, by phase difference between the light beam emitted from the light beam generator and the reflected light detected at a light beam receiver.

In step S190, it is determined whether or not the counter value "n" for discriminating reference points is "4", or whether or not the distance from the moving vehicle 1 has been measured for all the reference points. If it is negative, the process goes back to step S182 to increment the count value "n" and perform the similar process on the remaining reference points.

In step S191, on the basis of the detected distance between each reference point and the moving vehicle 1, and of the azimuth obtained by the initial pole discrimination process, the coordinates "X(n), Y(n)" of reference points A-D are calculated on some coordinate system with moving vehicle 1 being as the origin, for instance, a coordinate system with moving vehicle 1 being as the origin and with direction of the reference point A being as the positive direction of the x-axis.

In step S192, the above coordinates are converted to coordinates "x(n), y(n)" on a coordinate system with the reference point B being the origin.

The control function for performing the above operation will be described below. First, the function of the reflected light reception process is described. The function of the reflected light reception processing section shown in FIG. 20 corresponds to the contents of the reflected light reception process, the initial pole discrimination process and the pole selection process shown in FIGS. 8, 11 and 12, respectively.

In the same figure, a light signal from the outside is input to azimuth detecting means 37 and precession direction detecting means 38. The azimuth detecting means 37 has a counter for counting the number of the pulse signals input from the encoder 7, and the incidence direction (azimuth) of the light signal as seen from the moving vehicle 1 is detected on the basis of the pulse count value when the light signal is input. The detected azimuth is stored in memory means 39 for storing azimuth on a block basis.

For instance, the azimuth which was first detected is stored in memory region Am(0) as the azimuth of the first detection block. If the azimuth which was second detected substantially equals the azimuth which was previously detected in the first detection block, the storage data in Am(0) is renewed with the secondly detected azimuth, and if they are not in coincidence, the secondly detected azimuth is newly stored in a memory region Am(1). Thus, the light signals incident from the same or similar direction are stored as the data Am(i) of the same single detection block.

In memory means 40 for storing the number of light receptions on a block basis, the number of light receptions is stored on the basis of the detection blocks.

Means 41 for judging the number of light receptions determines the detection blocks that have received light beams the most times, and extracts four detection blocks in descending order of the number of light reception times Cg(i). The azimuths representative of the four extracted detection blocks are read out from the memory means 39 for storing azimuths on a block basis and stored in azimuth memory means 42. At this time, they are stored in memory regions Aps(1)-Aps(4) in ascending order. In predicted azimuth memory means 43, the predicted azimuth, that is, the direction to be detected in the next scan on the basis of the currently detected azimuth is stored. This predicted azimuth may be the same value as the currently detected azimuth or it may be a value obtained by adding a predefined value to the currently detected azimuth, as previously described.

Azimuth comparing means 44 compares the predicted azimuth with the current detected value, and outputs a coincidence signal "a" if both angles are in coincidence. In response to the coincidence signal "a", normally open switches SW1 and SW2 are closed, and various data are input and stored in memory means 45 for storing said data on a reference point basis. Such various data are the azimuth Ap, precession direction As, the number of revolutions Cm of the mirror 4 since the sensor 33 generates the output, and the number of light reception times Cp(n) on a reference point basis. Here, the values Ap, As and Cm are stored as a function of the reference point "n" and the number of light reception times Cp(n) on a reference point basis.

Figure 21:
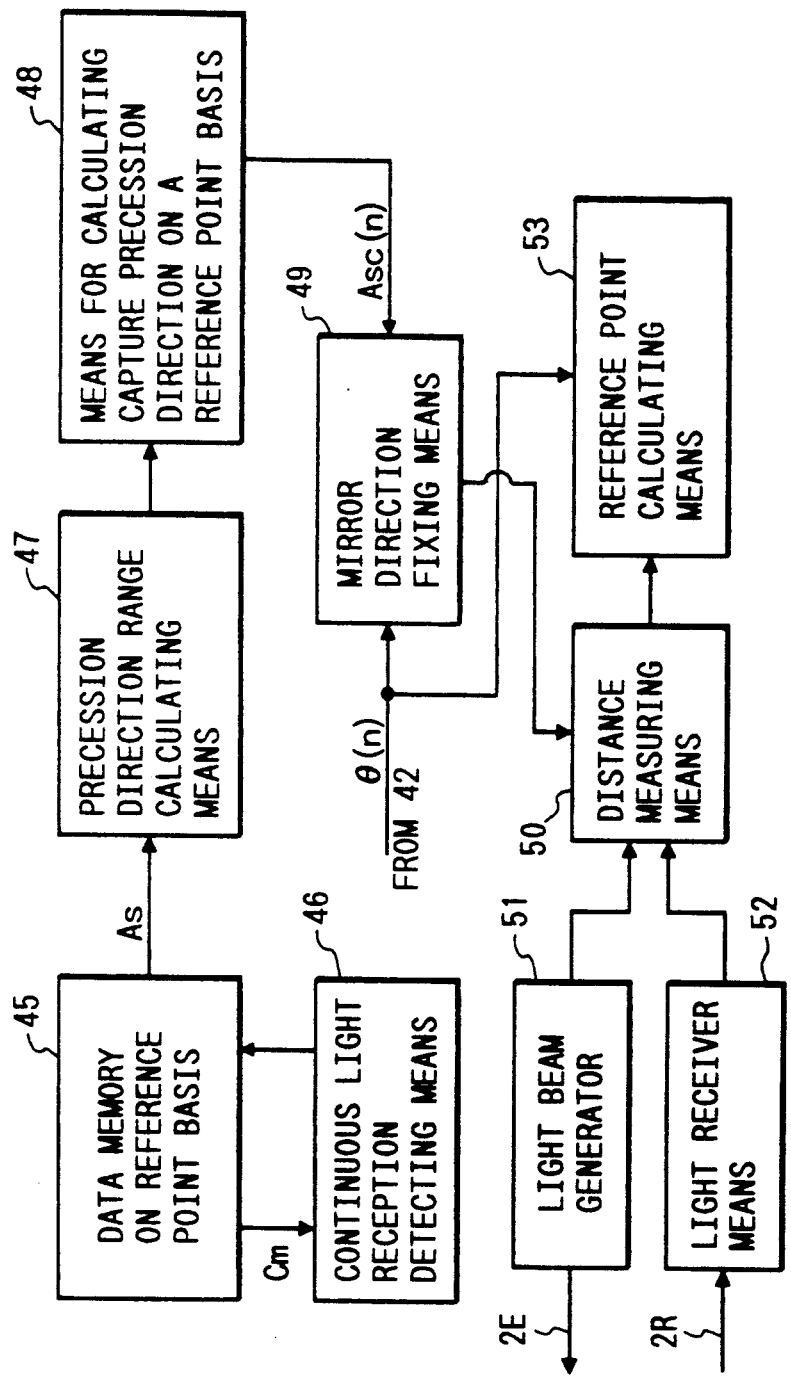
FIG. 21 is a block diagram showing the primary functions of the processing of detecting reference points.
Figure 22A:
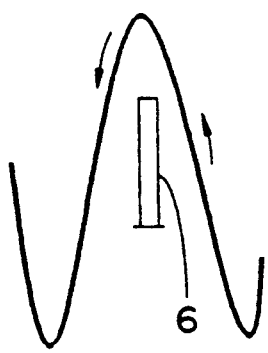
FIGS. 22A and 22B are illustrations respectively showing the relationship between the light tracks of the light beam and the retroreflector according to the prior art.
Figure 22B:
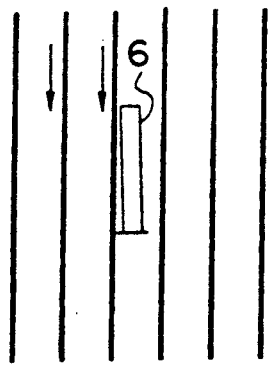

The function of the pole (reference point) position measuring processing means is now described with reference to FIG. 21, which is a block diagram showing the main functions of the pole position measuring processing means.

Figure 20:
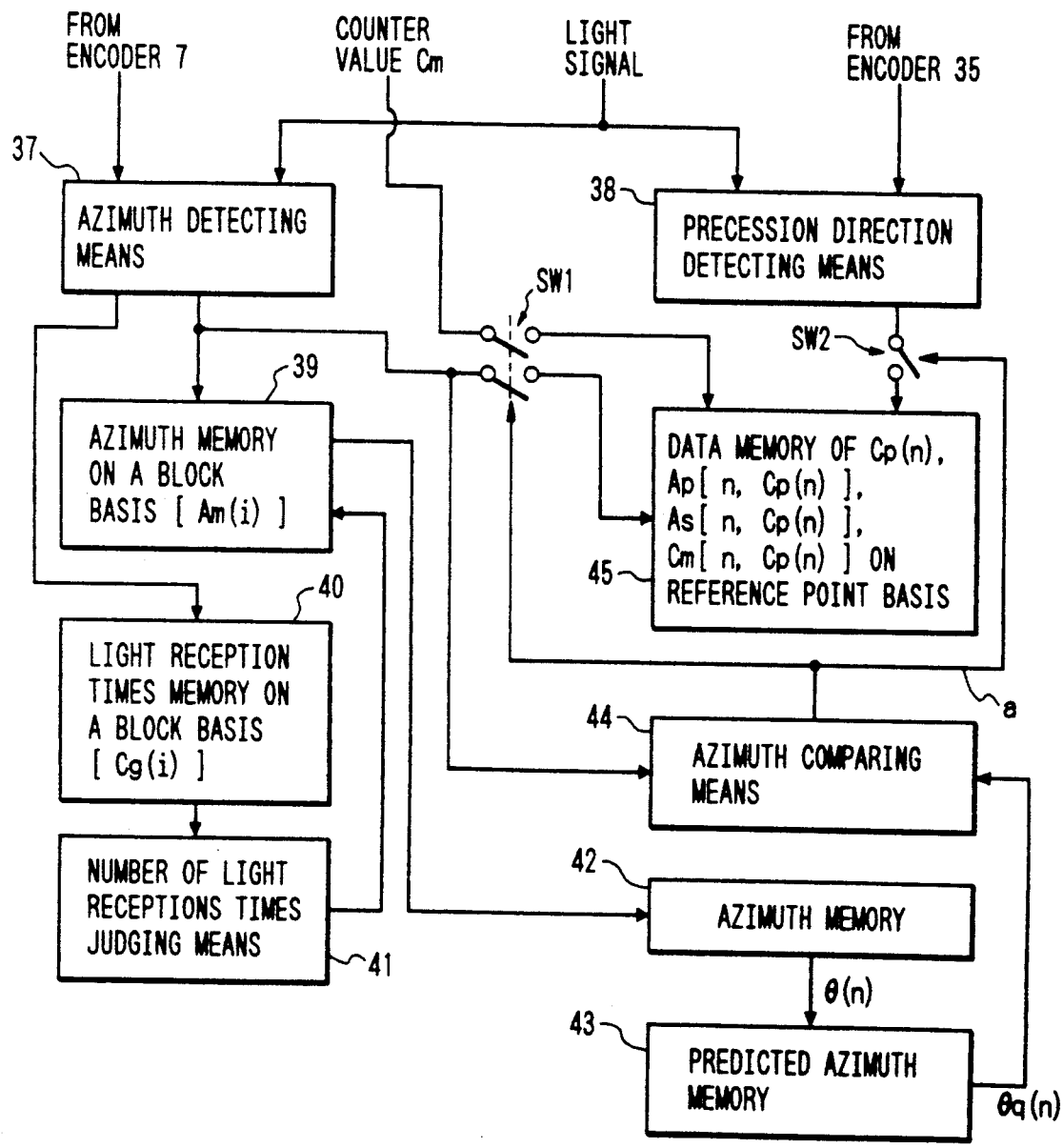
FIG. 20 is a block diagram showing the primary functions of the reflected light reception process.

In the same figure, continuous light reception detecting means 46 judges, based on the number of revolutions Cm of the mirror at the time when the light is received, whether or not the light signals are continuously detected each one rotation of the mirror 4. All the values of the precession directions in continuous periods during which the most light signals have been continuously detected are read out of the memory means 45 for storing data on a reference point basis, as shown in FIG. 20, supplied to precession direction range calculating means 47. In precession direction range calculating means 47, the range of precession directions are calculated on the basis of the maximum and minimum data of the supplied precession direction data.

In means 48 for calculating capture precession direction on a reference point basis, based on the data showing the precession direction range, the middle point of the range is calculated. The value Asc(n) of the middle point is supplied to mirror direction fixing means 49. Azimuth θ(n) is supplied from the azimuth memory means 42 of FIG. 20 to the mirror fixing means 49. In the mirror fixing means 49, using the data θ(n) and Asc(n) as the target values, the direction of the mirror 4, namely, its precession direction and azimuth are adjusted to fix the mirror at the direction and inclination shown by these target values.

When the mirror 4 has been fixed, the distance between the moving vehicle 1 and each reference point is measured in distance measuring means 50. The distance is calculated on the basis of, for instance, the difference between the phase of the light signal emitted from the light beam generator means 51 and the phase of the light signal detected at the light beam receiver means 52. In reference point calculating means 53, the position coordinates [X(n), Y(n)] of a reference point are calculated on the basis of the measured distance and azimuth θ(n).

A modification of the rotative scanner or the device for rotating mirror 4 around central axis of rotation 8 will be described. The modified rotative scanner includes additional means for finely adjusting the stop position of mirror 4 after the attracting plate 34 is attracted by the electromagnet 16, and an improvement for making the whole scanner 2 small-sized.

Figure 16:
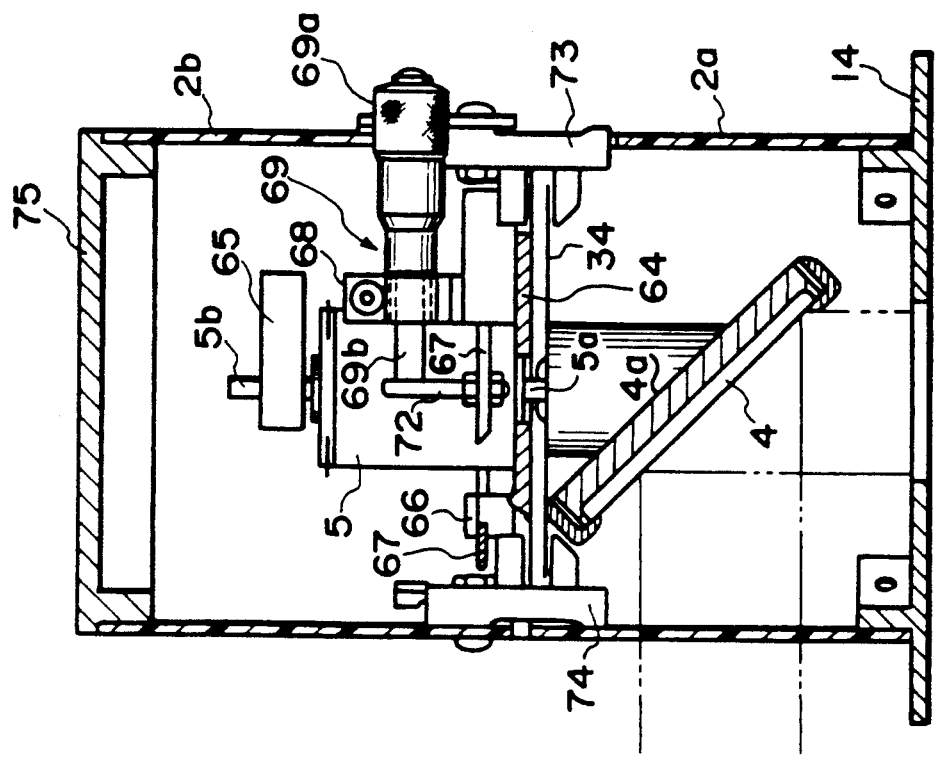
FIG. 16 is a partial sectional front view of the light beam scanner.
Figure 17:
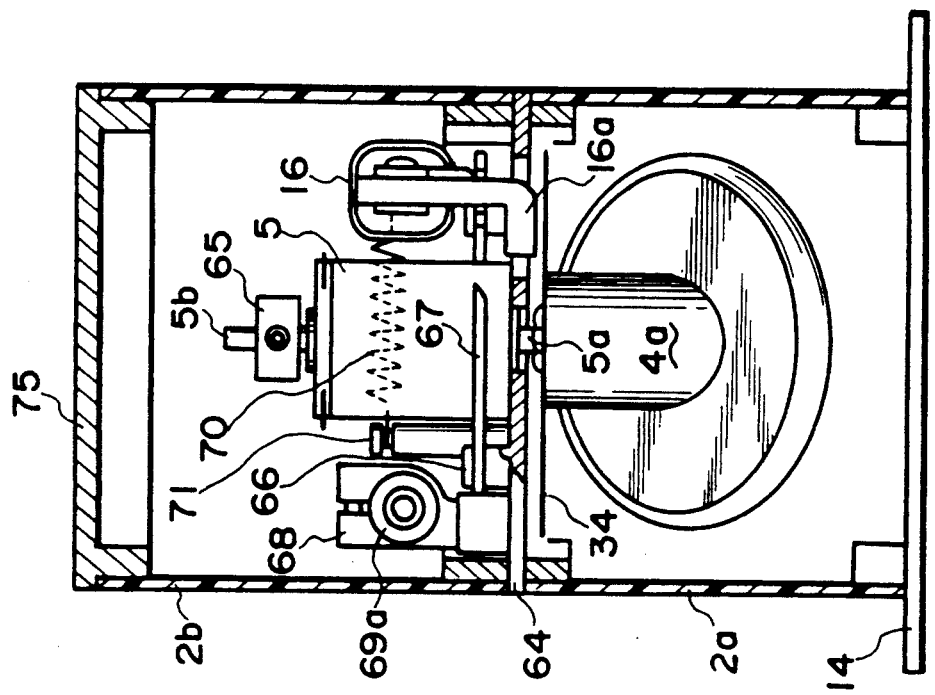
FIG. 17 is a partial sectional side view of the light beam scanner.

FIG. 16 is a partial sectional front view of scanner 2 and FIG. 17 is a partial sectional side view of the same, in which the same symbols as FIG. 1 represent the same or equivalent portions.

In these figures, a rotating shaft projects from both ends of motor 5 mounted above base plate 64. The pedestal 4a of mirror 4 is fixed to one end 5a of the shaft, and balancer 65 is fixed to the other end 5b for fast and smooth rotation of the motor 5. On the base plate 64, a plurality of projections 66 are disposed at appropriate intervals on a circle around the rotating shaft of motor 5, and a guide groove is formed on the side surface of each projection 66 opposite the motor 5. The inner peripheral portion of ring-shaped rotatable bracket 67 is fitted in the guide grooves, and the rotatable bracket 67 can be rotated around motor 5 while it is guided by the guide grooves.

The magnetic pole 16a of electromagnet 16 fixed to the rotatable bracket 67 downwardly projects through holes provided in the rotatable bracket 67 and base plate 64, and is opposed to attracting plate 34. Electromagnet 16 is fixed to the rotatable bracket 67 so that the magnetic pole 16a thereof has a predetermined spacing with respect to the attracting plate 34 on the pedestal 4a.

Fixed to base plate 64 is holder 68, by which feed screw device 69 is held. The spindle 69b of feed screw 69 is screw-fed by rotating knob 69a, whereby it is allowed to move back and forth.

In order to bias the rotatable bracket 67 in one direction with respect to base plate 64 with the guide grooves of the projections 66 as a guide an extension coil spring 70 is provided between the base plate 64 and rotatable bracket 67. For instance, one end of extension coil spring 70 is engaged with rod 71 which is vertically provided on base 64, and the other end of the spring 70 is engaged with a hole or the like provided in rotatable bracket 67 or electromagnet 16.

A rod 72 is vertically provided on the rotatable bracket 67. Rod 72 is provided in such a position that it abuts on the end face of spindle 69b when the rotatable bracket 67 is rotated in one direction by the tensile force of coil spring 70. Since rod 72 fixed to the bracket 67 is pressed against spindle 69b by coil spring 70, rotation of knob 69b causes spindle 69 to move forward and backward according to the rotational direction thereof, and the bracket 67, hence the mirror 4 is rotated around the shaft of the motor 5 by a very small angle.

In the attracting plate 34, a large number of slits are formed at equal intervals over the whole circumference in the vicinity of the periphery thereof. One of these slits is extended longer than others toward the center of attracting plate 34. A pair of light transmission sensors 73 and 74 are placed so that the periphery of the attracting plate 34 is sandwiched by each of them. One sensor 73 is provided to detect the large number of slits, and the other sensor 74 is provided to detect the longer slit extended toward the center of attracting plate 34. The rotational angle of mirror 4 can be detected on the basis of the outputs of the sensors 73 and 74.

The base plate 64 is supported by a cylinder 2a of a transparent material such as glass or acrylic resin, and the cylinder 2a is attached to the inner ring member 14 of the gimbal precession mechanism. Further a cylinder 2b and its cover 75 are mounted above base plate 64. Since cylinder 2b, different from cylinder 2a, is not required to transmit light, it is not particularly limited to any material.

With the above construction, if a fine adjustment is further required after the electromagnet 16 is energized to cause attracting plate 34 to be attracted by magnetic pole 16a thereby for fixing the position of mirror 4, fine adjustment can be made by feed screw device 69. That is, by causing the rotatable bracket 7 to displace around motor 5 by a very small angle, the stop position of attracting plate 34 attracted by electromagnet 16 fixed to the bracket 67, or of mirror 4, can be finely adjusted.

The need for adjusting the stop position of mirror 4 with the feed screw device 69 can be informed, for instance, by detecting the existence of a light reception signal, and activating a display such as a pilot lamp or sound generator when there is no light reception signal.

Although, in this embodiment, feed screw device 69 has a simple construction allowing manual operation, it is of course possible that it can be automatically adjusted by driving and controlling a step motor (not shown) engaged with bracket 67 in response to, for instance, the activation signal to the display such as a pilot lamp.

As obvious from the above description, in accordance with the present invention, when a light beam is rotatively scanned in the horizontal direction while also being vertically scanned at a speed slower than the rotative scanning speed, thereby setting the projective direction of the light beam with respect to light reflector means vertically disposed at reference points apart from an observation point so that the light beam surely crosses the light reflector means, the positional information of the light reflector means (reference points) can be measured precisely and simply prior to start of the work. As a result, even if the position detecting system is located in a place which is not flat, only by appropriately placing the light reflector means serving as reference points around the observation spot, the trouble of accurately measuring its position beforehand and manually inputting the measurement result to the controller is saved.

What is claimed is:

1. A position detecting system having rotative scanning means for rotatively scanning a light beam in a circular direction around an observation spot, and light receiver means for receiving at the observation spot said light beam reflected by light reflector means placed apart from the observation spot, wherein the relative positional relation between said observation spot and said light reflector means is detected on the basis of the detection signal of the reflected light, comprising:

precessional scanning means for causing the central axis of rotation of said rotative scanning to precess so as to draw a substantially conical locus, thereby also vertically vibrating said light beam, means for detecting and storing the azimuth of the rotative scanning direction and the precessional angle of said precessional scanning means, respectively, when a light signal is detected by said light receiver means, means for respectively setting said rotative scanning means and precessional scanning means at the stored azimuth and the precessional angle thereby to fix the projection direction of the light beam, and means for projecting the light beam with said fixed projection direction and detecting the reflected light thereof, and measuring the distance between said observation spot and the light reflecting means on the basis of the detected signal, whereby the position of the light reflecting means with respect to the observation spot is calculated on the basis of the measured distance and the azimuth.

2. A position detecting system as set forth in claim 1 wherein said light receiver means is disposed at a fixed position relative to said central axis of rotation of said rotative scanning means.

3. A position detecting system as set forth in claim 1 wherein said observation spot is on a moving body and said position detecting system is carried on said moving body.

4. A position detecting system having rotative scanning means for rotatively scanning a light beam in a circular direction around an observation spot, and light receiver means for receiving at the observation spot said light beam reflected by light reflector means placed apart from the observation spot, wherein the relative positional relation between said observation spot and said light reflector means is detected on the basis of the detection signal of the reflected light, comprising:

precessional scanning means for causing the central axis of rotation of said rotative scanning means to precess so as to draw a substantially conical locus, thereby also vertically vibrating said light beam, means for detecting and storing the azimuth of the rotative scanning direction and the precessional angle of said precessional scanning means, respectively, when a light signal is detected by said light receiver means, means for calculating a middle point of the precessional angle ranges in which the reflected light is always detected for each continuous light projection in a predetermined very small range of azimuth, means for respectively setting said rotative scanning means and precessional scanning means at said stored azimuth and the middle point position of the precessional angle ranges thereby to fix the projection direction of the light beam, and means for projecting the light beam with said fixed projection direction and detecting the reflected light thereof, and measuring the distance between said observation spot and the light reflecting means on the basis of the detected signal, whereby the position of the light reflecting means with respect to the observation spot is calculated on the basis of the measured distance and the azimuth.

5. A position detecting system as set forth in claim 4 wherein said middle point is the mean value of the maximum and minimum values of the precessional angle ranges in which the reflected light is continuously detected for each light projection in said predetermined very small range of azimuth.

6. A position detecting system as set forth in claim 4 wherein said middle point is the mean value of the precessional angles in which the reflected lights are continuously detected for light projections in said predetermined very small range of azimuth.

7. A position detecting system as set forth in claim 4 wherein when the reflected light in said predetermined very small range has been continuously detected the most times, said middle point is calculated on the basis of a group of the corresponding precessional angle data.

8. A position detecting system as set forth in claim 4 wherein said light receiver means is disposed at a fixed position relative to said central axis of rotation of said rotative scanning means.

9. A position detecting system as set forth in claim 4 wherein said observation spot is on a moving body and said position detecting system is carried on said moving body.

10. A position detecting system wherein light beam generator means and light receiver means for detecting light reflected by light reflector means placed at positions apart from said light beam generator means are disposed at an observation spot, whereby the relative positional relation of said light reflector means and observation spot is detected on the basis of a detected signal of said light receiver means, comprising:

scanning means for rotatively scanning the light beam generated in said light beam generator means in a circular direction while vertically vibrating said light beam, means for detecting the azimuth of the incident light when light is detected by said light receiver means, reference point recognizing means for recognizing that the number of the detected azimuths has become equal to the number of previously placed light reflector means and generating an output therefor, means for stopping the rotative scanning of the light beam and fixing the projective direction of the light beam to the direction shown by each of said azimuths when the reflected light from said direction is detected after said reference point recognizing means has generated an output, means for detecting the reflected light of said light beam with the projective direction of said light beam being fixed, and measuring the distance between the observation spot and the light reflector means on the basis of the detection signal, means for releasing the fixing of the projective direction of the light beam after said distance measurement has finished, and means for repeating said distance measurement between all of said predetermined light reflector means and the observation spot, and calculating the relative positional relations between said light reflector means and the observation spot on the basis of the measured distances and the azimuthal data therefor.

11. A position detecting system as set forth in claim 10 further including means for storing the substantially same azimuths of detected lights as a single group of azimuthal data.

12. A position detecting system as set forth in claim 10 further including a common table on which said light beam generator means and light receiver means are mounted, wherein said table is precessed so that a central axis of rotation of said scanning means draws a conical locus, and causing the rotative scanning of said scanning light beam to be performed a plural number of times during one cycle of the precession, thereby to vertically vibrate said light beam.

13. A position detecting system as set forth in claim 12 further including means for detecting the precession angle of the table and the azimuth of light beam projection when a light signal is detected by the light receiver means, wherein the precession of the table is stopped at said detected precession angle, a second rotative scanning is performed in this stop condition of the table precession, and the second rotative scanning is stopped to fix the light beam projection direction on the condition that a light signal is again detected in the second rotative scanning condition, at the azimuth at which a light signal has been detected, for performing said distance measurement.

14. A position detecting system as set forth in claim 10 wherein said means for fixing the projection direction of a light beam includes a disk of a magnetic substance rotating with the means for rotatively scanning a light beam, and a fixed electromagnet which attracts the disk to stop the rotation thereof.

15. A position detecting system as set forth in claim 14 further including adjustment means for selectively displacing said electromagnet by a very small amount around said rotative scanning means.

* * * * *